(12) United States Patent
Dole

(10) Patent No.: US 8,556,302 B2
(45) Date of Patent: Oct. 15, 2013

(54) PIVOTING PIPE COUPLING HAVING A MOVABLE GRIPPING BODY

(75) Inventor: Douglas R. Dole, Whitehouse Station, NJ (US)

(73) Assignee: Victaulic Company, Easton, PA (US)

( * ) Notice: Subject to any disclaimer, the term of this patent is extended or adjusted under 35 U.S.C. 154(b) by 38 days.

(21) Appl. No.: 13/438,186

(22) Filed: Apr. 3, 2012

(65) Prior Publication Data
US 2012/0256415 A1 Oct. 11, 2012

Related U.S. Application Data

(60) Provisional application No. 61/471,713, filed on Apr. 5, 2011.

(51) Int. Cl.
*F16L 17/00* (2006.01)
(52) U.S. Cl.
USPC ............................................ 285/367; 285/112
(58) Field of Classification Search
USPC .................. 285/367, 373, 419, 337, 111, 112
See application file for complete search history.

(56) References Cited

U.S. PATENT DOCUMENTS

| | | | |
|---|---|---|---|
| 591,796 A | 10/1897 | De Wolf | |
| 711,946 A | 10/1902 | Day | |
| 1,004,634 A | 10/1911 | Dixon | |
| 1,532,596 A | 4/1925 | Madsen | |
| 1,662,954 A | 3/1928 | Broido | |
| 1,791,810 A | 2/1931 | Furman | |
| 1,821,863 A | 9/1931 | Wilson | |
| 1,930,194 A | 10/1933 | Dillon | |
| 2,005,056 A | 6/1935 | Stephens | |
| 2,028,182 A | 1/1936 | Barnickol, Jr. | |
| 2,182,797 A | 12/1939 | Dillon | |
| 2,377,510 A * | 6/1945 | Newell | 285/112 |
| 2,473,046 A | 6/1949 | Adams, Jr. | |
| 2,512,741 A | 6/1950 | Goodall | |
| 3,003,793 A | 10/1961 | Pitt | |

(Continued)

FOREIGN PATENT DOCUMENTS

WO 2008144332 A1 11/2008

OTHER PUBLICATIONS

English, Peter; Order Granting Ex Parte Reexamination / Decision Granting Ex Parte Reexamination for related U.S. Patent No. 7,950,701; Control No. 90/012,060; United States Patent and Trademark Office, Central Reexamination Unit; Jan. 20, 2012; pp. 1-13.

(Continued)

*Primary Examiner* — Aaron Dunwoody
(74) *Attorney, Agent, or Firm* — Ballard Spahr LLP

(57) ABSTRACT

A coupling for securing pipe elements together in end-to-end relation has segments joined at one end by a pivot attachment and at an opposite end by an adjustable connection member. The segments surround a central space which receives the pipe elements. A gripping body is captured between the segments. The segments have angularly oriented reaction surfaces. The gripping body has angularly oriented contact surfaces which interface with the reaction surfaces. When the segments are drawn toward each other by the connection members, interaction between the reaction surfaces and the contact surfaces forces the gripping body radially inwardly. Inwardly facing arcuate surfaces on the segments and the gripping body engage and retain the pipe elements. A method of inserting pipe elements into the coupling while the segments and the gripping body are supported on a seal is also disclosed.

18 Claims, 25 Drawing Sheets

(56) References Cited

U.S. PATENT DOCUMENTS

| | | |
|---|---|---|
| 3,078,108 A | 2/1963 | Smith |
| 3,116,078 A | 12/1963 | Scherer |
| 3,249,371 A | 5/1966 | Peterman |
| 3,329,446 A | 7/1967 | Katis et al. |
| 3,351,352 A | 11/1967 | Blakeley et al. |
| 3,479,066 A | 11/1969 | Gittleman |
| 4,417,755 A | 11/1983 | Gittleman |
| 4,438,954 A | 3/1984 | Hattori |
| 4,611,835 A | 9/1986 | Gittleman |
| 4,611,839 A | 9/1986 | Rung et al. |
| 4,639,020 A | 1/1987 | Rung et al. |
| 4,702,499 A | 10/1987 | De Raymond et al. |
| 4,729,582 A | 3/1988 | Zeidler |
| 5,037,141 A | 8/1991 | Jardine |
| 5,058,931 A | 10/1991 | Bowsher |
| 5,121,946 A | 6/1992 | Jardine |
| 5,161,836 A | 11/1992 | McKinnon |
| 5,188,401 A | 2/1993 | Staniforth |
| 5,230,537 A | 7/1993 | Newman |
| 5,295,716 A | 3/1994 | Bridges |
| 5,605,357 A | 2/1997 | Bird |
| 5,722,701 A | 3/1998 | Choi |
| 5,758,907 A | 6/1998 | Dole et al. |
| 5,769,467 A | 6/1998 | Bridges |
| 5,772,253 A | 6/1998 | Hodge et al. |
| 6,206,434 B1 | 3/2001 | Schreiter |
| 6,328,352 B1 | 12/2001 | Geppert et al. |
| 6,367,849 B1 | 4/2002 | Tatsuta et al. |
| 6,499,771 B1 | 12/2002 | Snyder, Sr. et al. |
| 6,533,333 B1 | 3/2003 | Radzik |
| 7,086,131 B2 | 8/2006 | Gibb et al. |
| 7,107,662 B1 | 9/2006 | Levario |
| 7,390,026 B2 | 6/2008 | Noda |
| 7,396,053 B2 | 7/2008 | Webb et al. |
| 7,401,819 B2 | 7/2008 | Gibb et al. |
| 7,712,796 B2 | 5/2010 | Gibb et al. |
| 7,748,753 B2 | 7/2010 | Krausz et al. |
| 7,950,701 B2 | 5/2011 | Dole et al. |
| 7,988,207 B2 | 8/2011 | Dole et al. |
| 2003/0062718 A1 | 4/2003 | Radzik |
| 2005/0017510 A1 | 1/2005 | Rigollet et al. |
| 2005/0104369 A1 | 5/2005 | Webb et al. |
| 2005/0258641 A1 | 11/2005 | Gibb |
| 2006/0049636 A1 | 3/2006 | Webb et al. |
| 2006/0103135 A1 | 5/2006 | Scott |
| 2008/0284161 A1 | 11/2008 | Dole et al. |

OTHER PUBLICATIONS

English, Peter; Office Action in Ex Parte Reexamination for related U.S. Patent No. 7,950,701; Control No. 90/012,060; United States Patent and Trademark Office, Central Reexamination Unit; Jan. 20, 2012; pp. 1-7.

Copenheaver, Blaine R.; PCT International Search Report from corresponding International Patent Application No. PCT/US2012/032038; International Searching Authority, United States; United States Patent and Trademark Office, Jun. 14, 2012; pp. 1-2.

Copenheaver, Blaine R.: PCT Written Opinion of the International Searching Authority from corresponding International Patent Application No. PCT/US2012/032038; International Searching Authority, United States; United States Patent and Trademark Office; Jun. 14, 2012; pp. 1-8.

Dauvergne, Bertrand; Supplementary European Search Report and European Search Opinion from related European patent application No. EP08755442; European Patent Office, Apr. 6, 2010. pp. 1-6.

Young, Lee W.; PCT Written Opinion of the International Searching Authority from related International patent application No. PCT/US08/63587; Sep. 15, 2008; pp. 1-7.

Santella, Lena; Examiner's Report from related Canadian Patent Application No. 2,686,708; Canadian Intellectual Property Office; Apr. 11, 2011; pp. 1-17.

Kee, Fannie C; Non-Final Office Action from related U.S. Appl. No. 13/113,124; United States Patent and Trademark Office, Dec. 27, 2011; pp. 1-9.

Dunwoody, Aaron; Notice of Allowability from related U.S. Appl. No. 13/113,124; United States Patent and Trademark Office, Feb. 27, 2012; pp. 1-4.

Afzali, Sarang; Non-Final Office Action from related U.S. Appl. No. 13/011,199; United States Patent and Trademark Office, Feb. 8, 2012; pp. 1-10.

Double Bolt Clamp With Saddles Mar. 15, 2012, [online], [retrieved on Mar. 15, 2012] Retrieved from Dixon Valve & Coupling website using Internet <URL:http://www.dixonvalve.com/product/1360.html>.

* cited by examiner

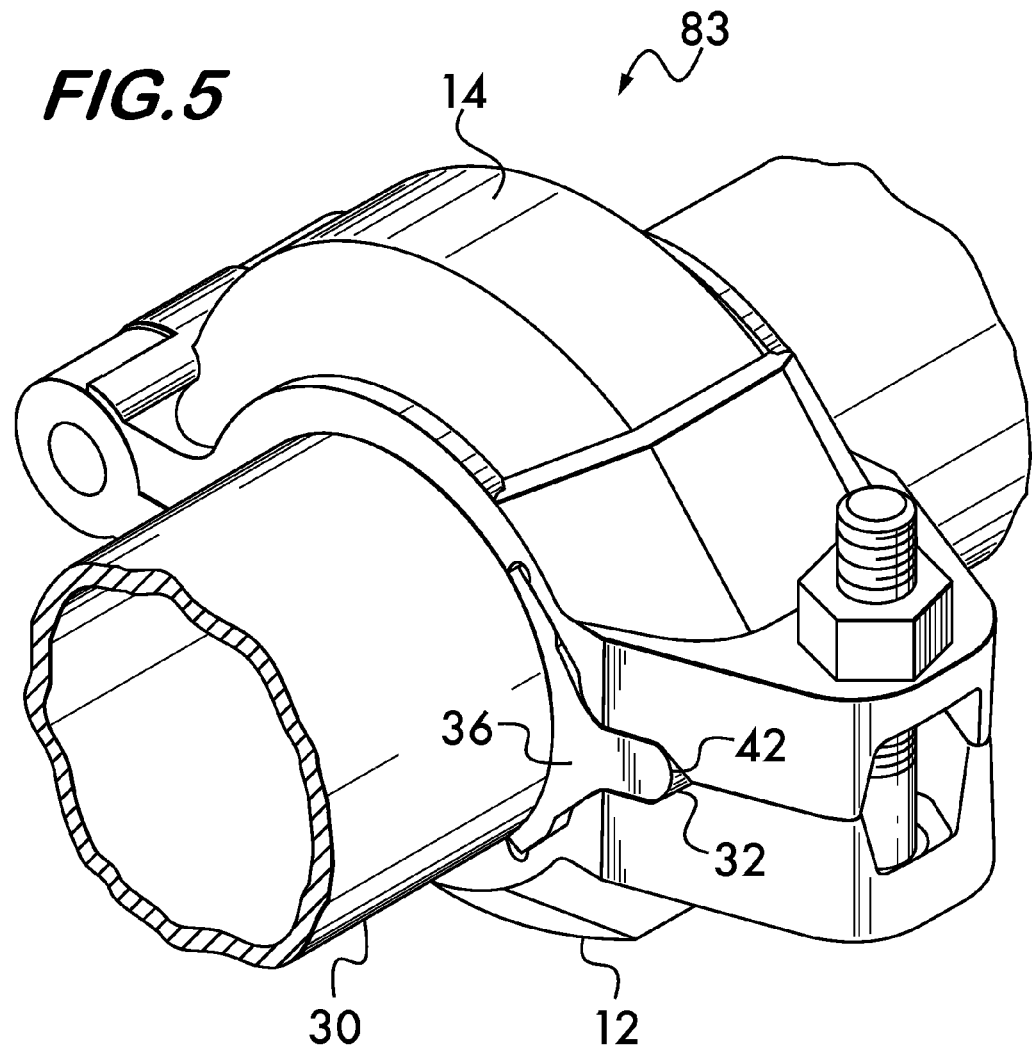

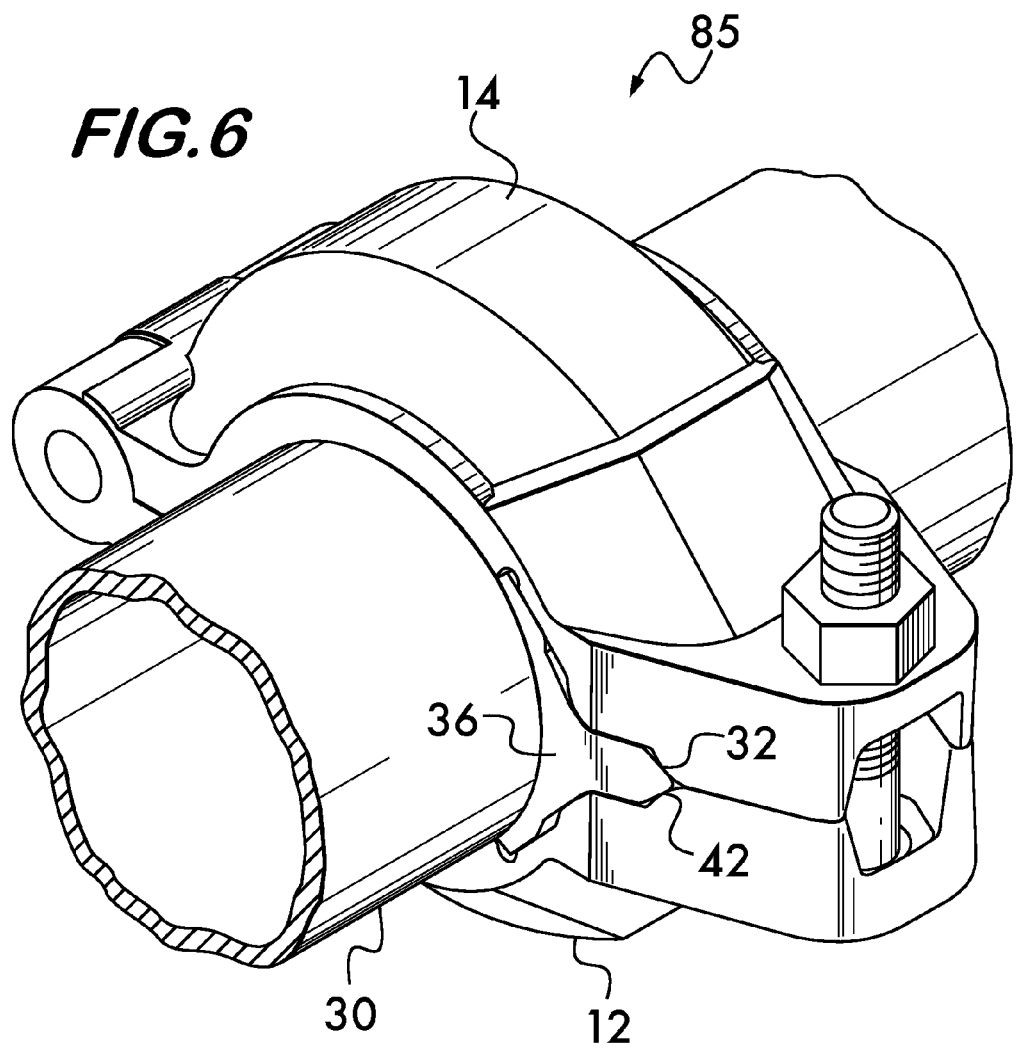

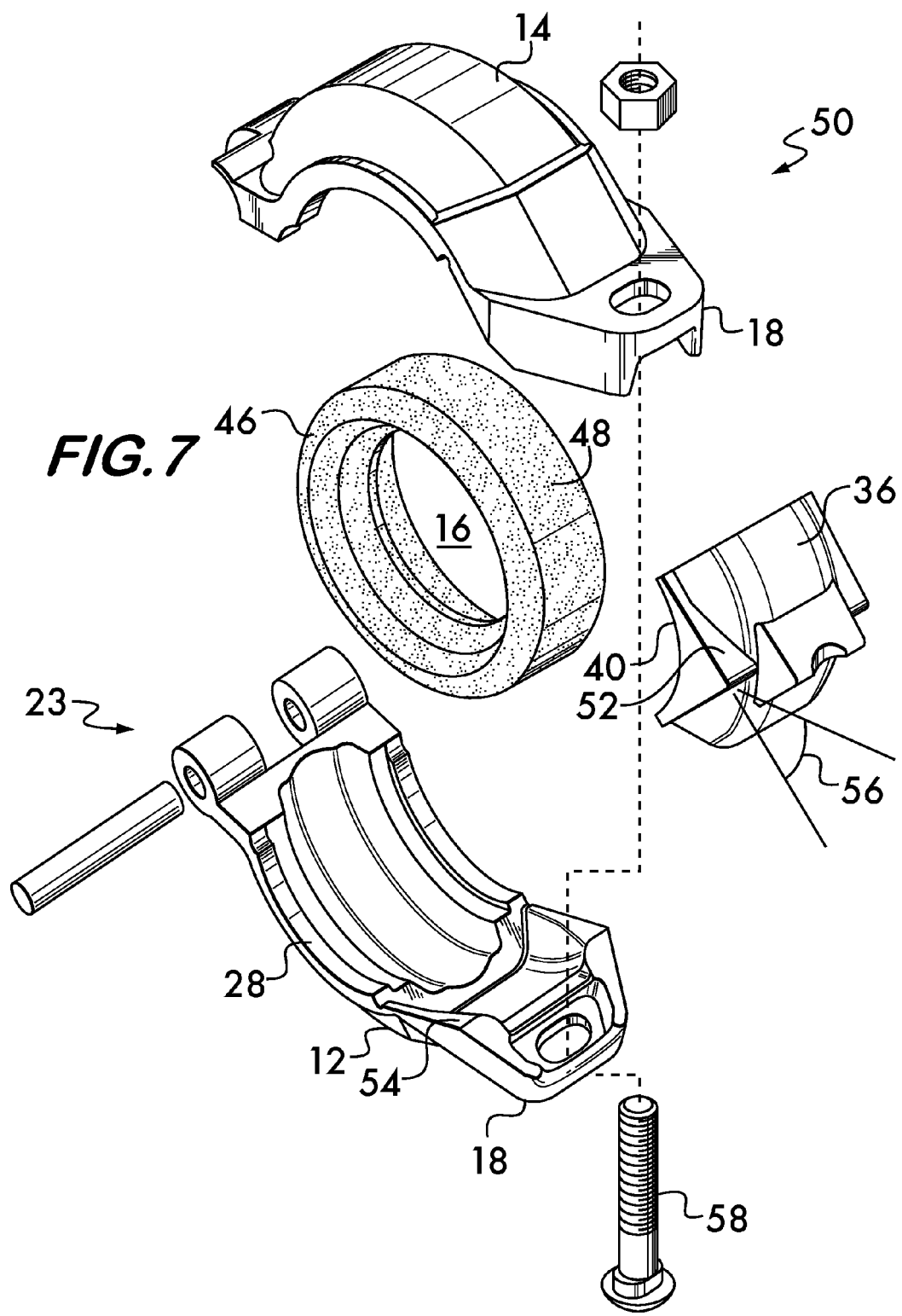

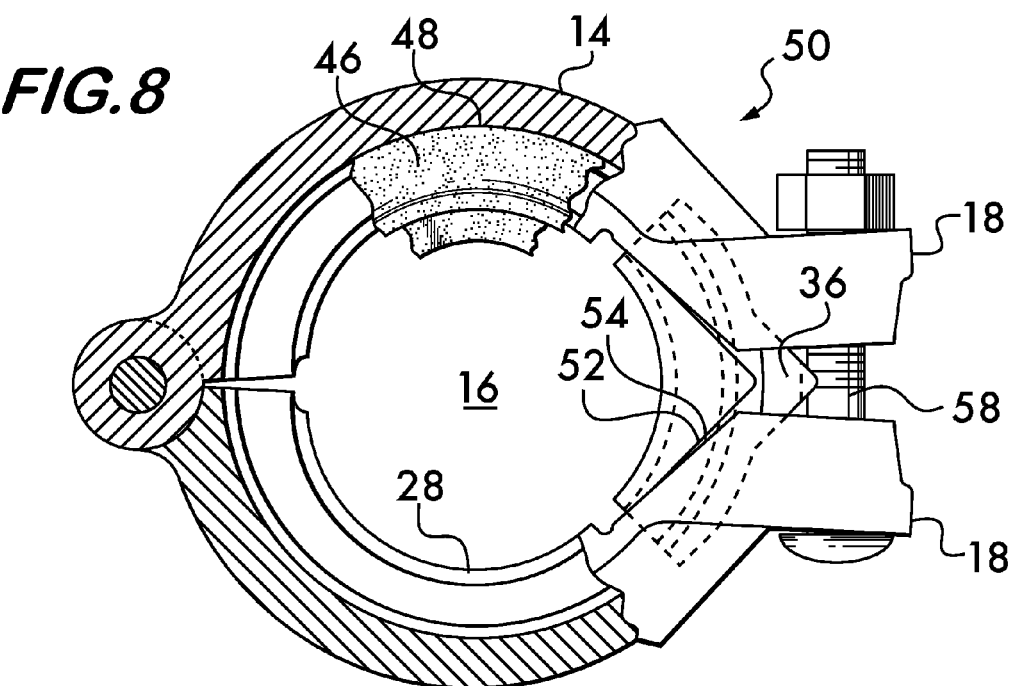
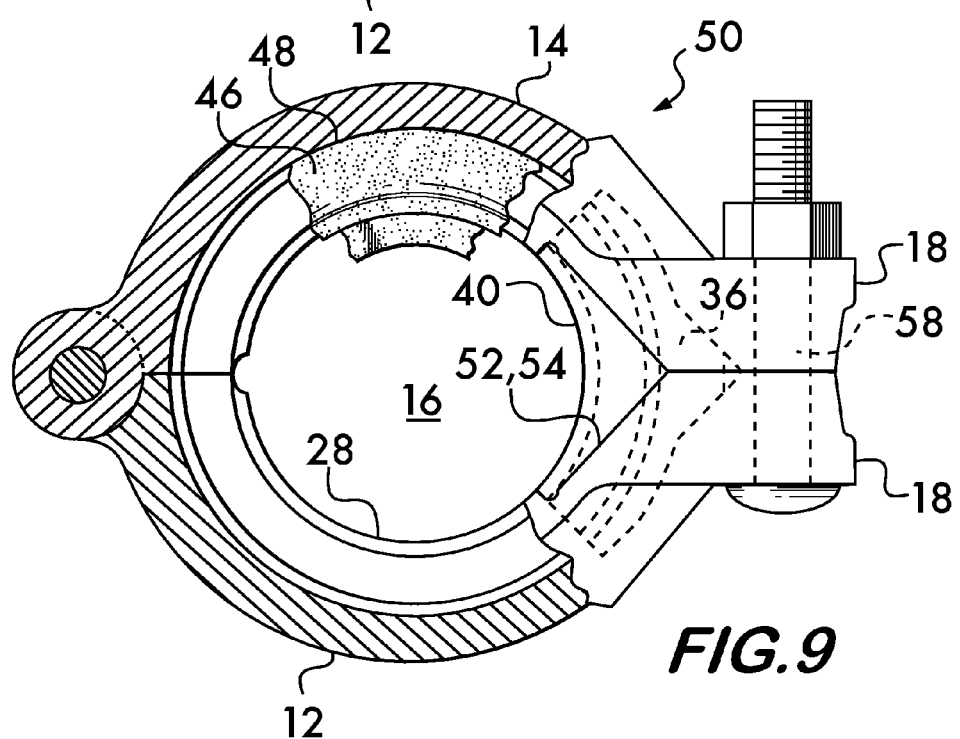

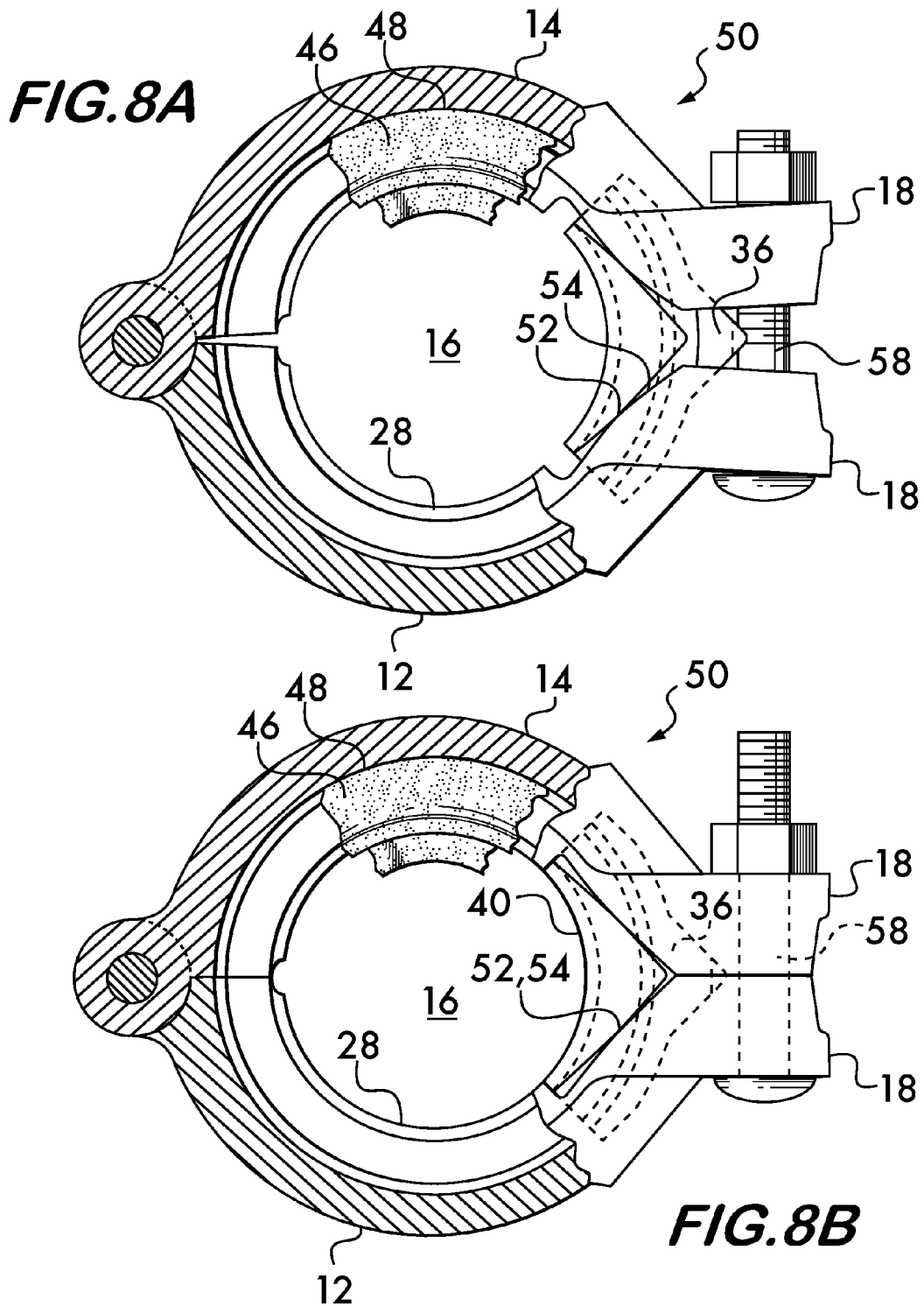

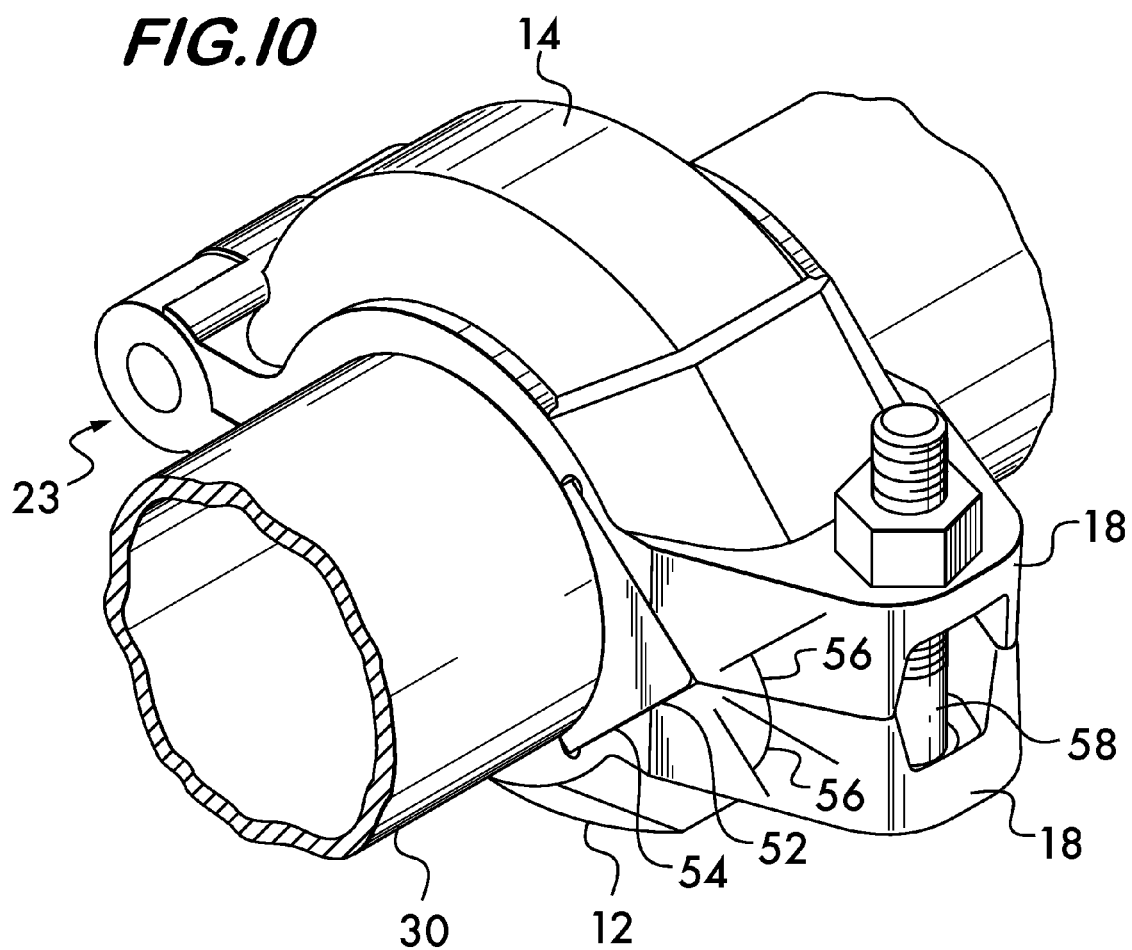

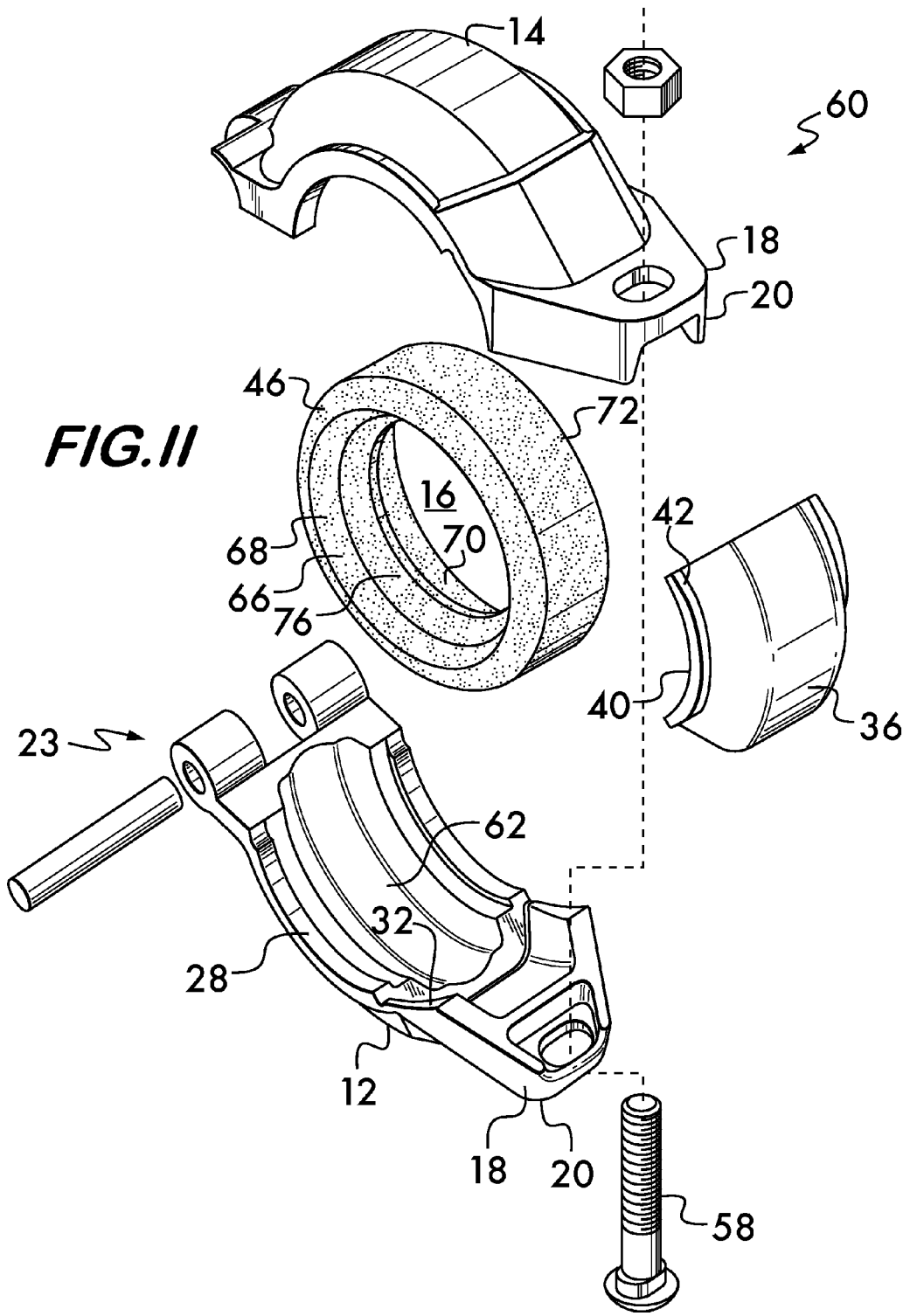

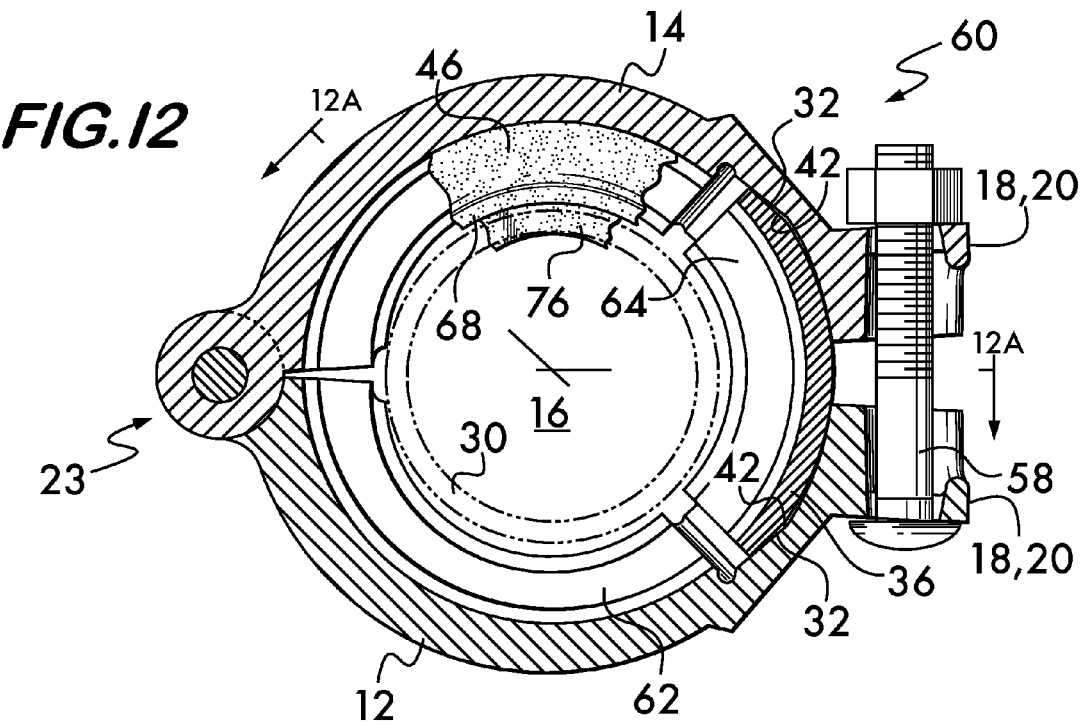
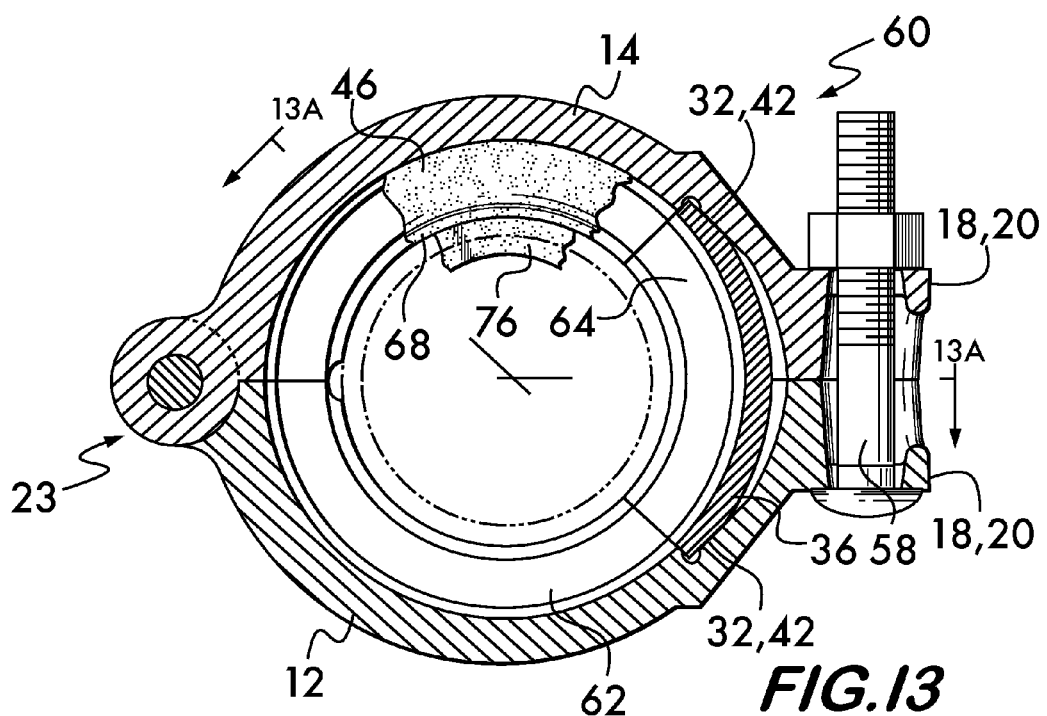

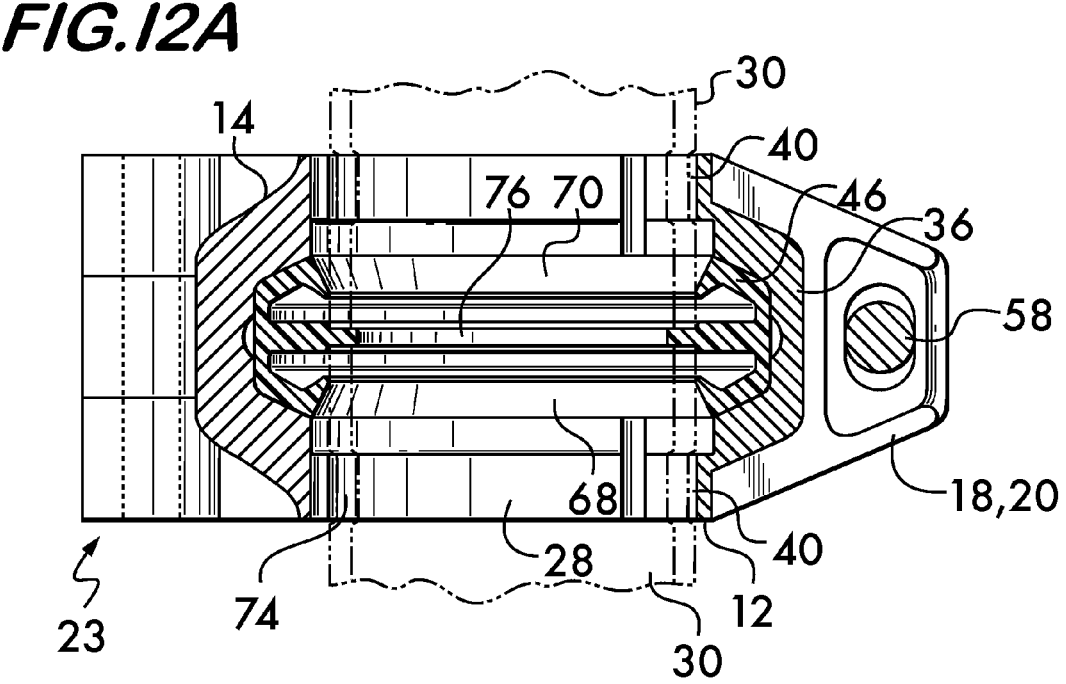
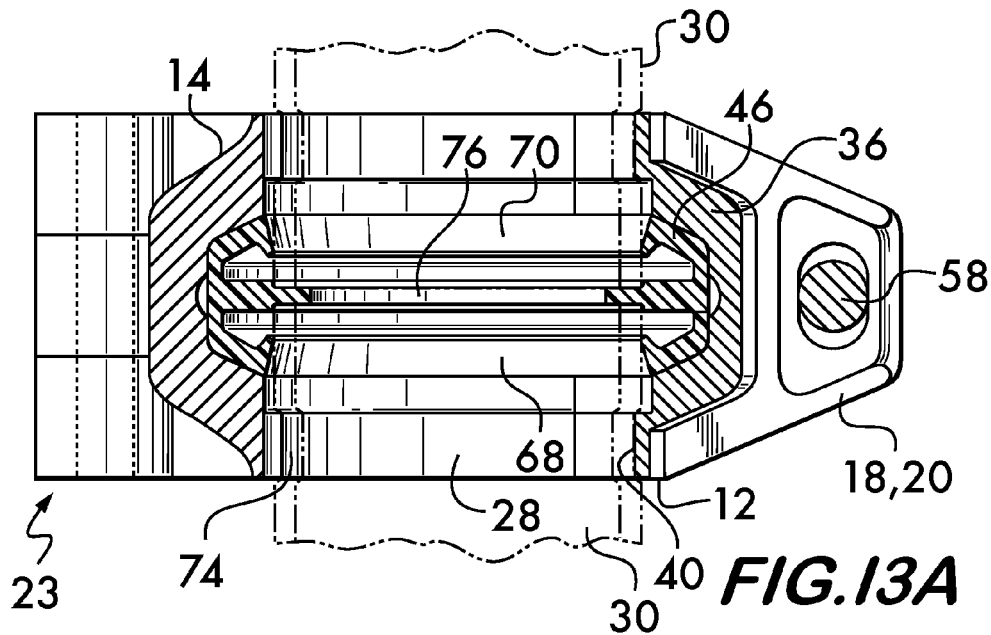

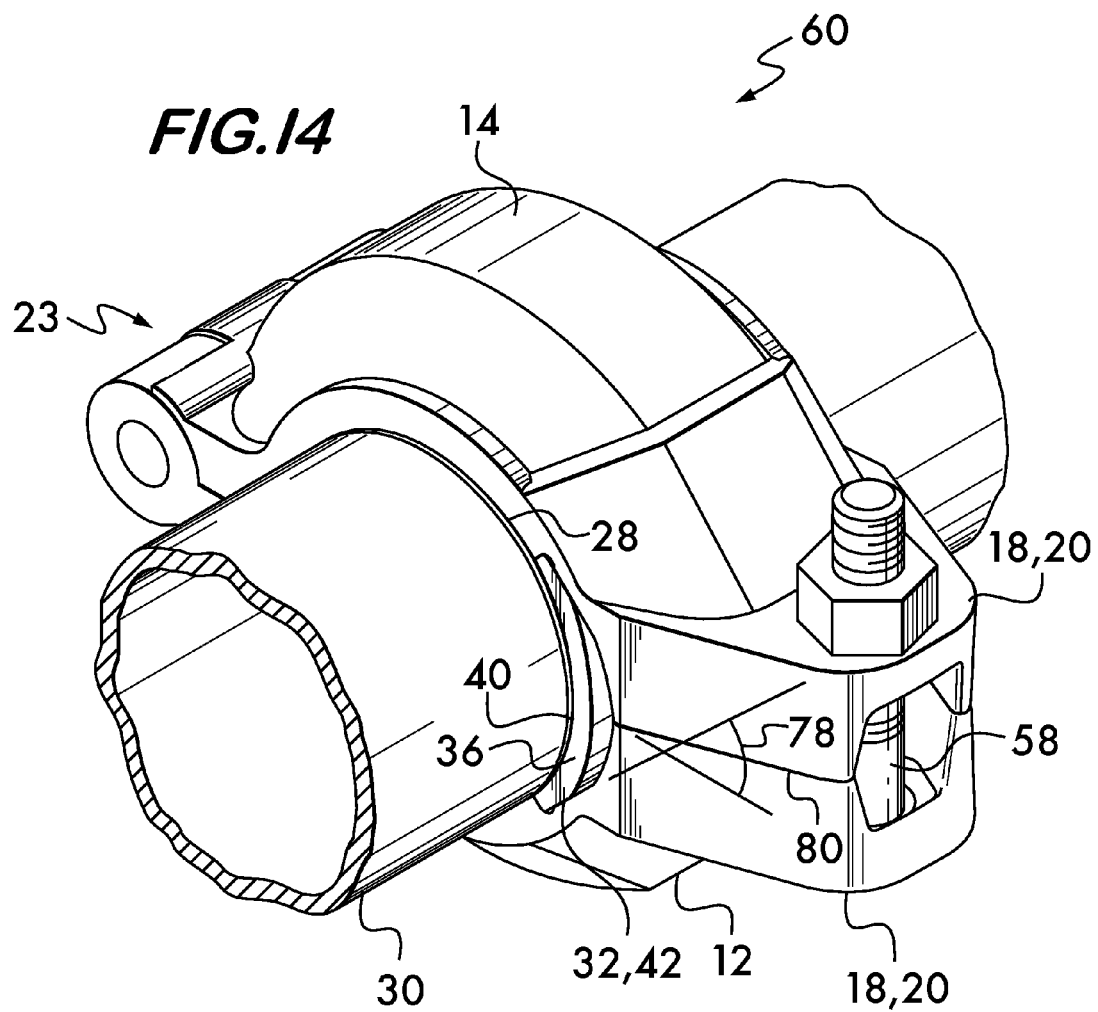

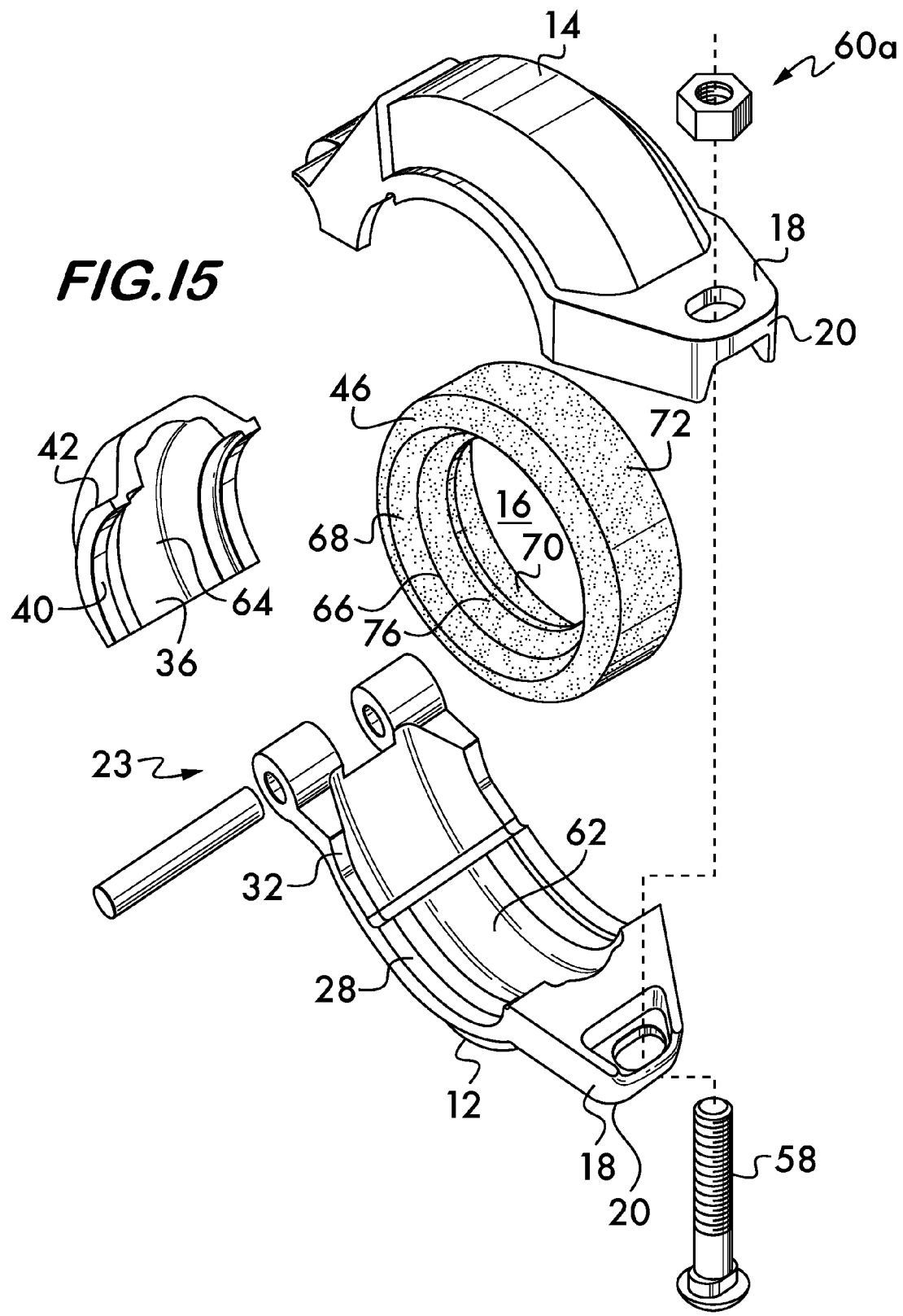

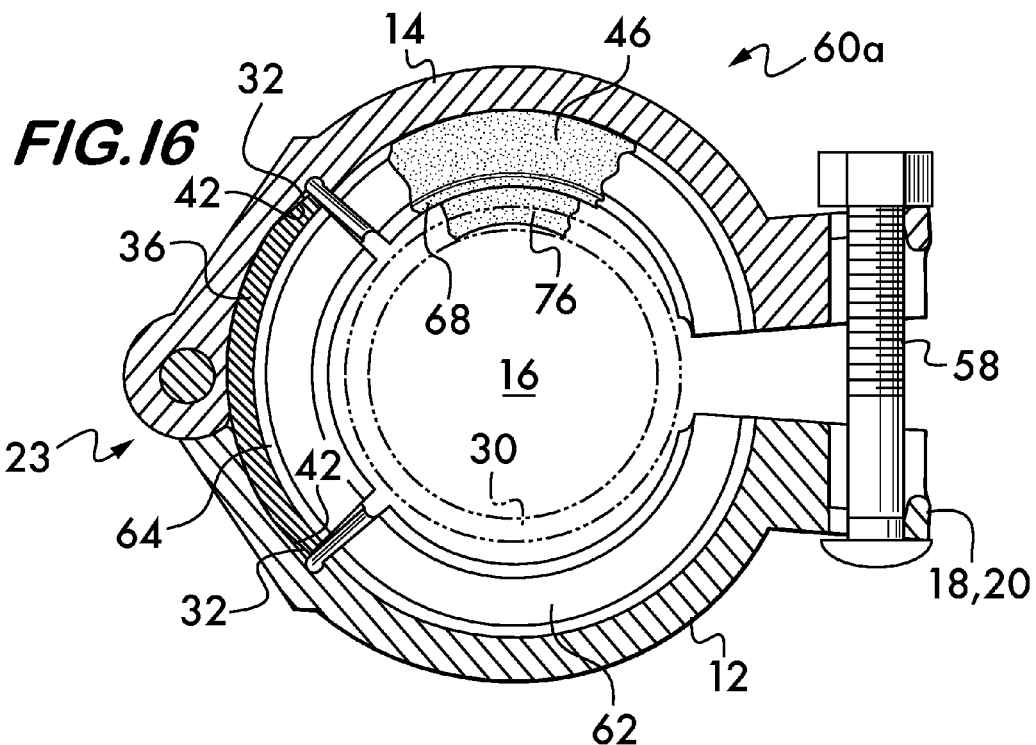
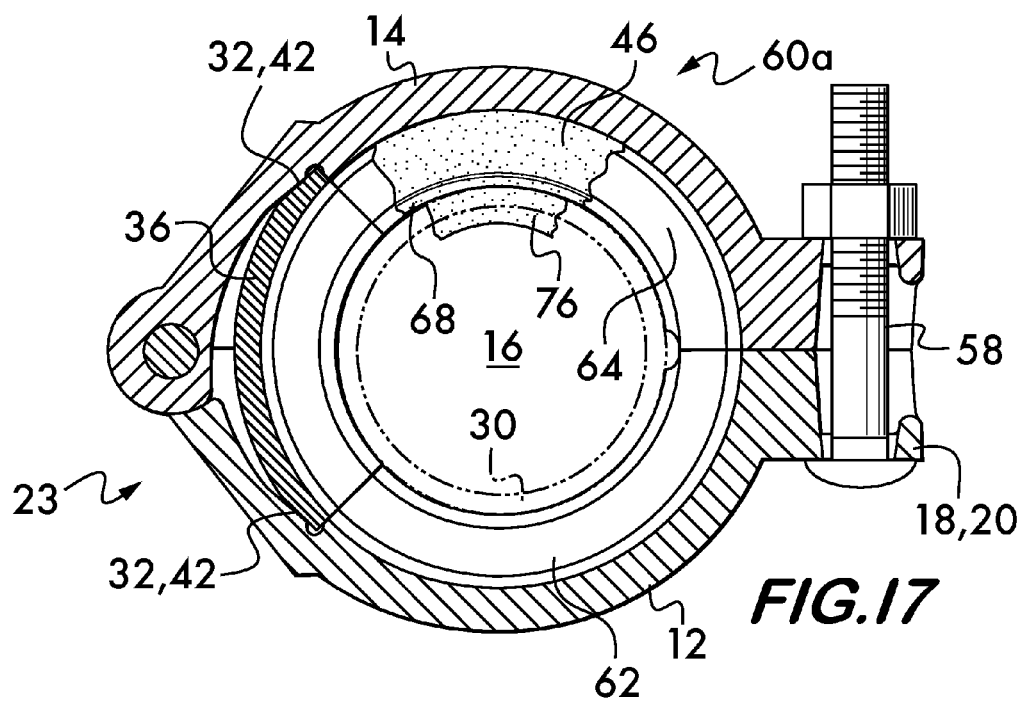

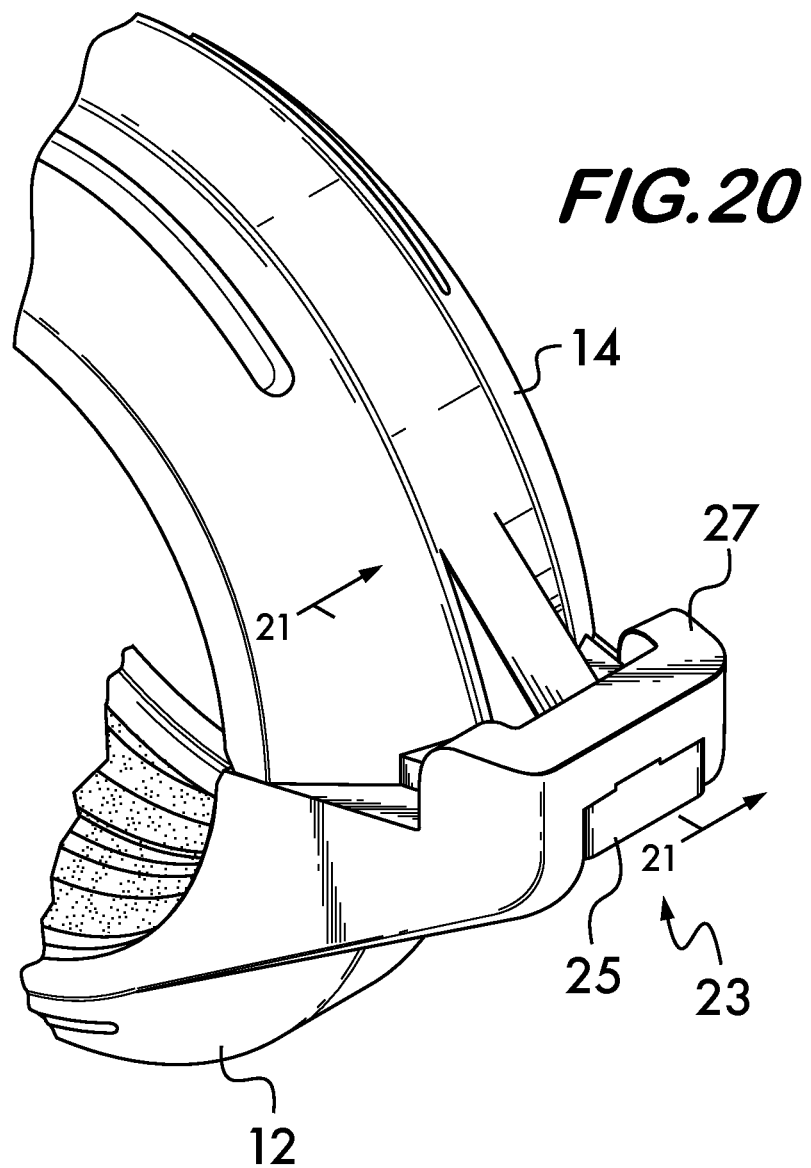

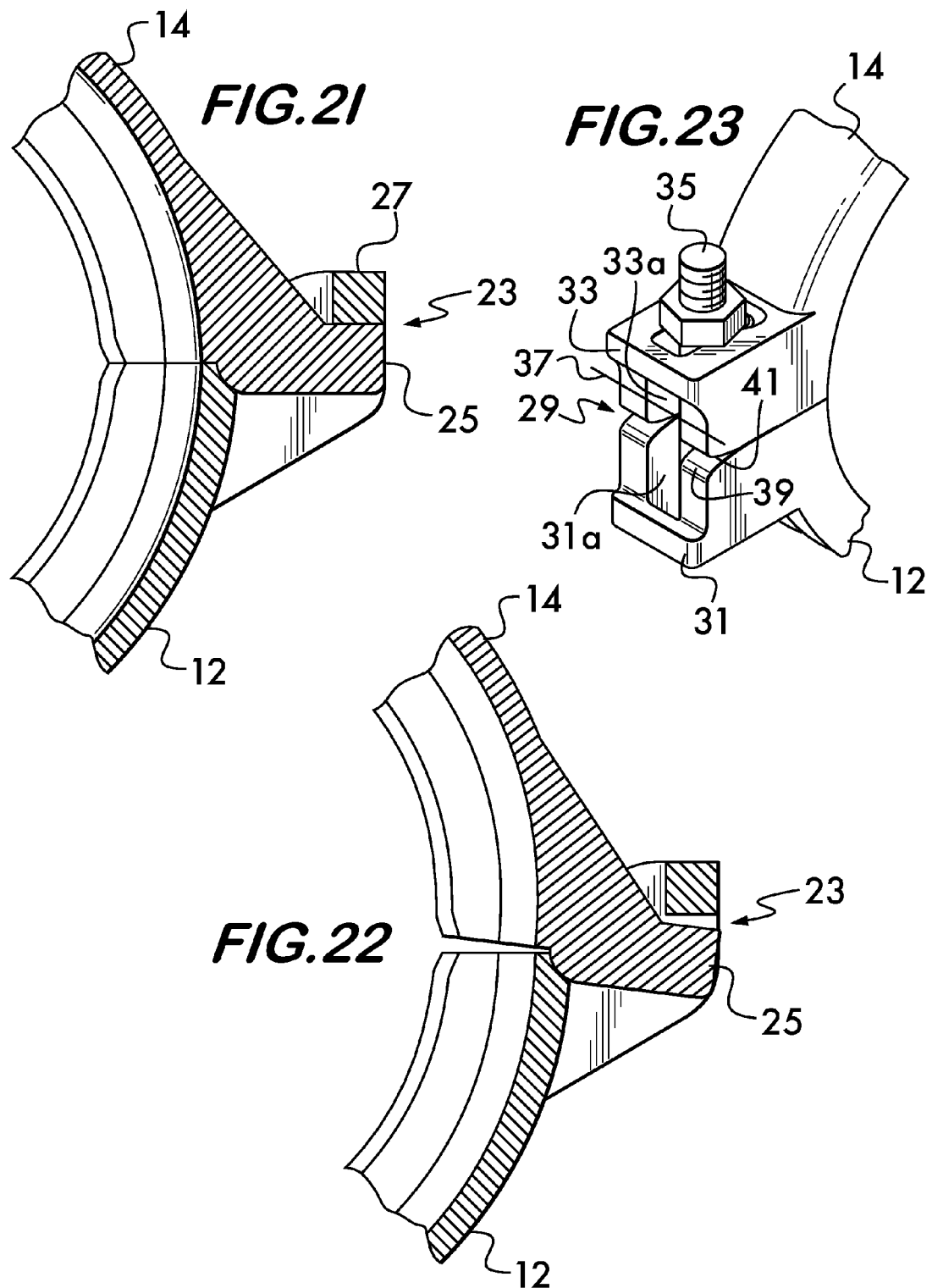

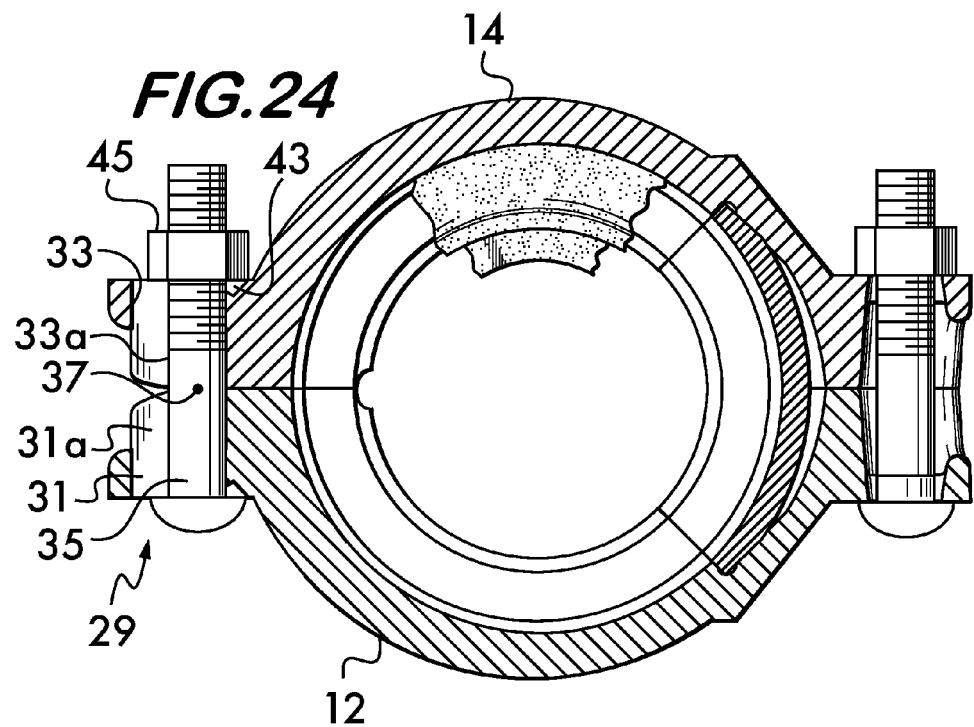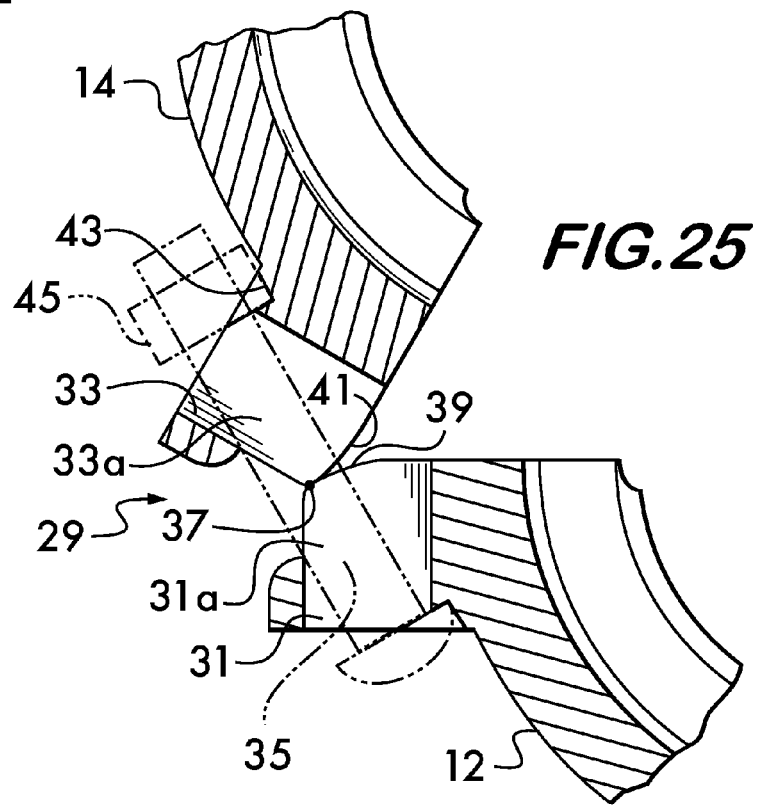

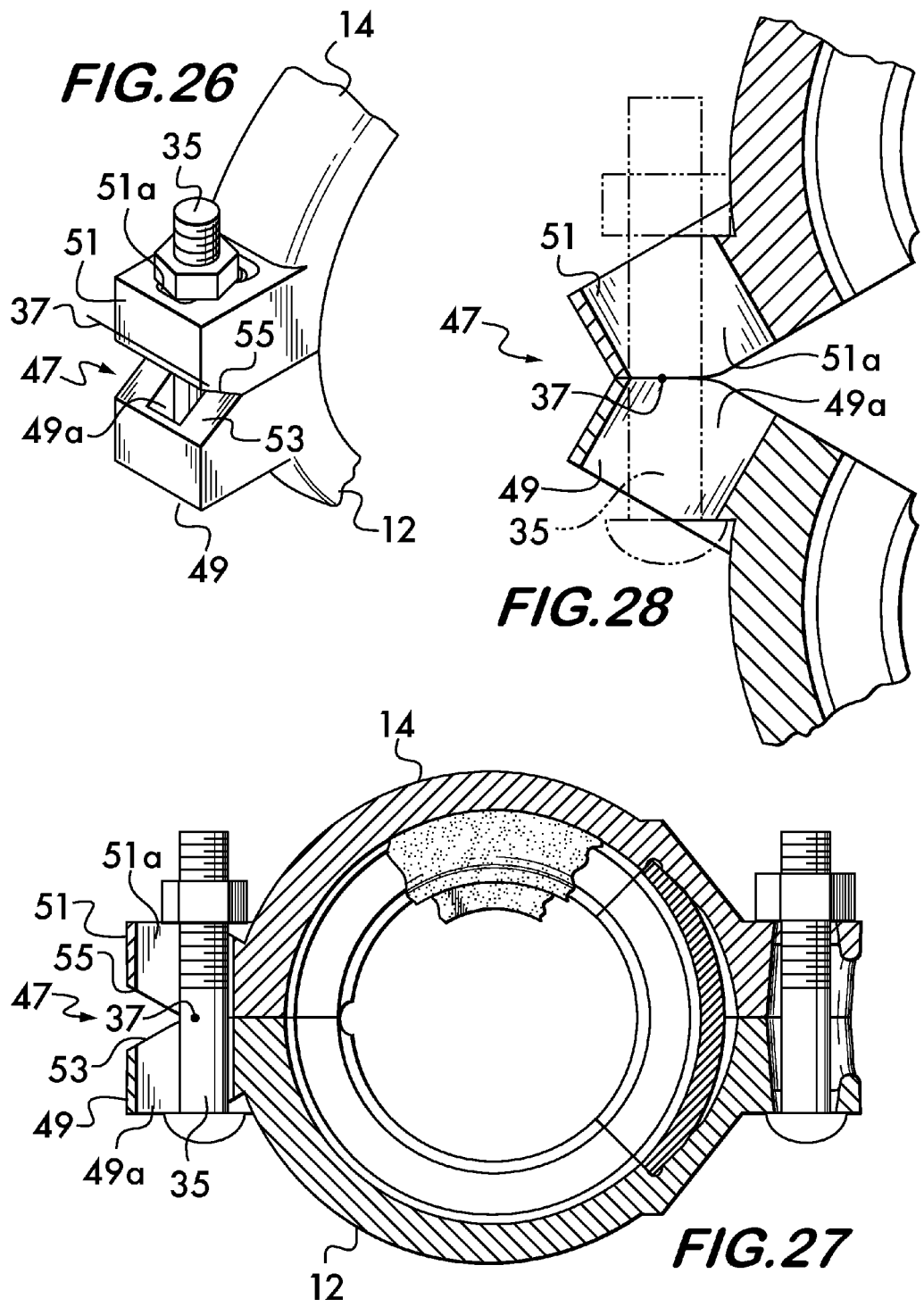

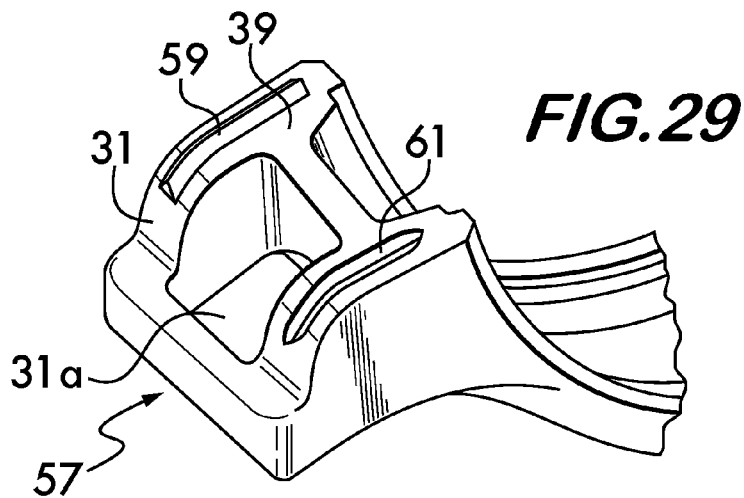
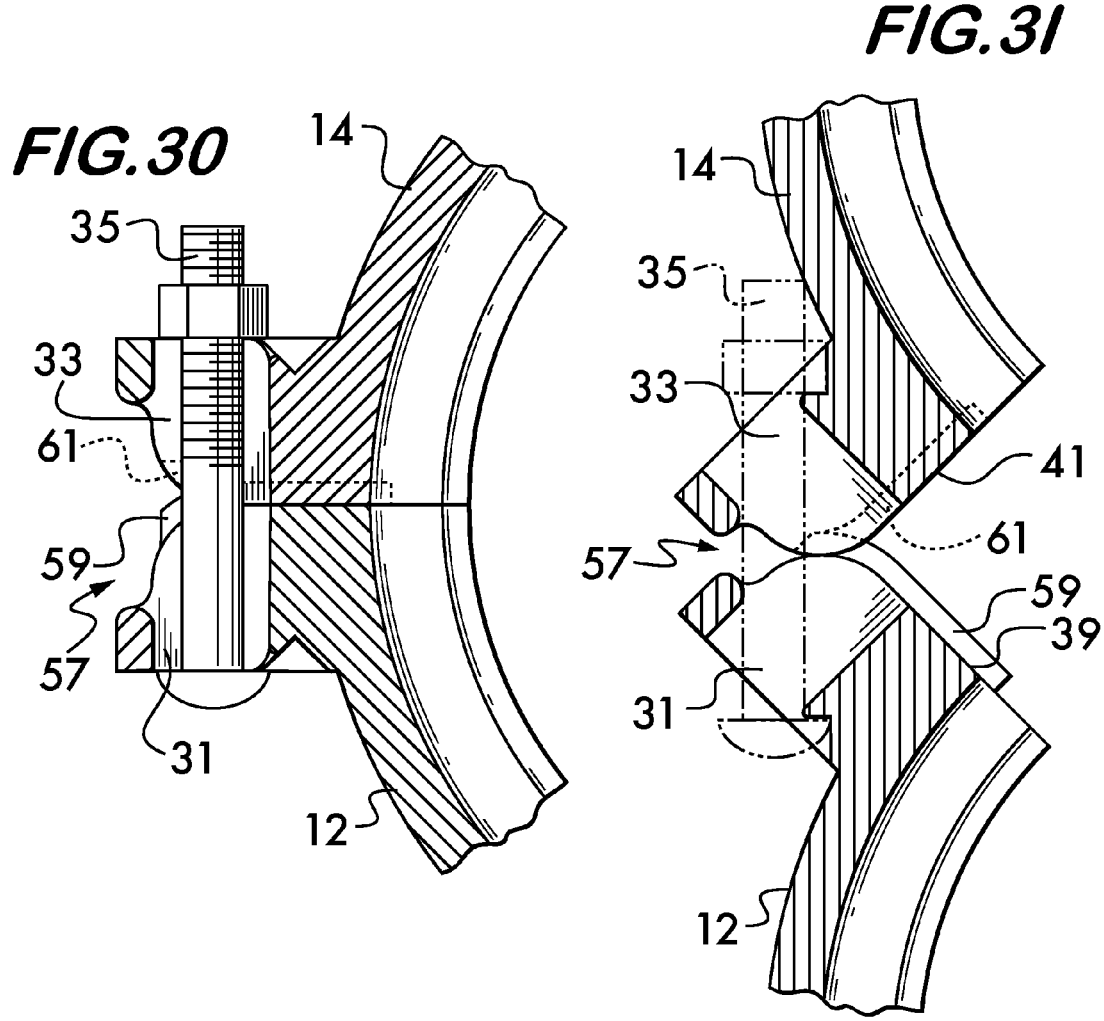

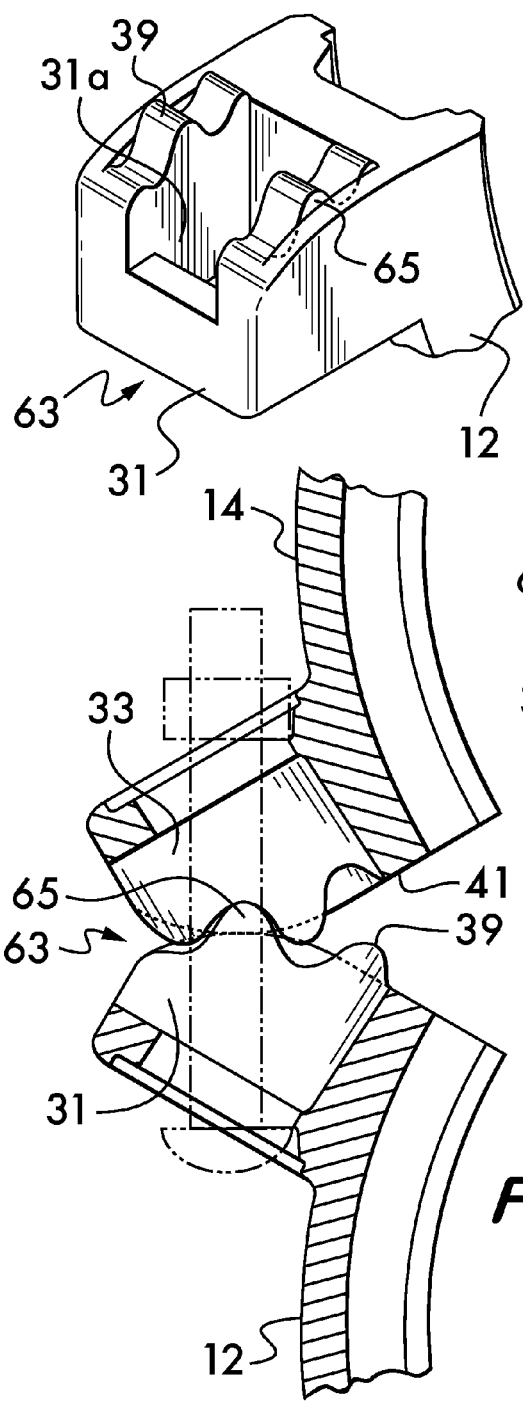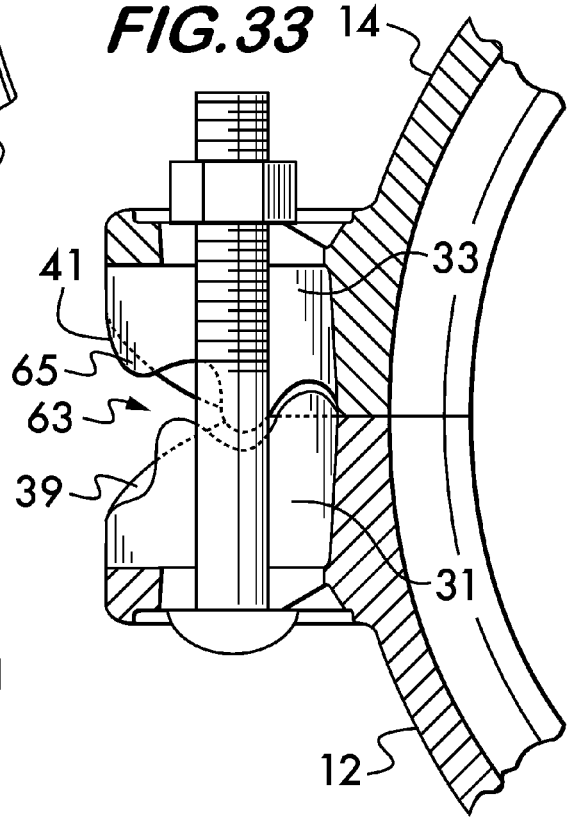

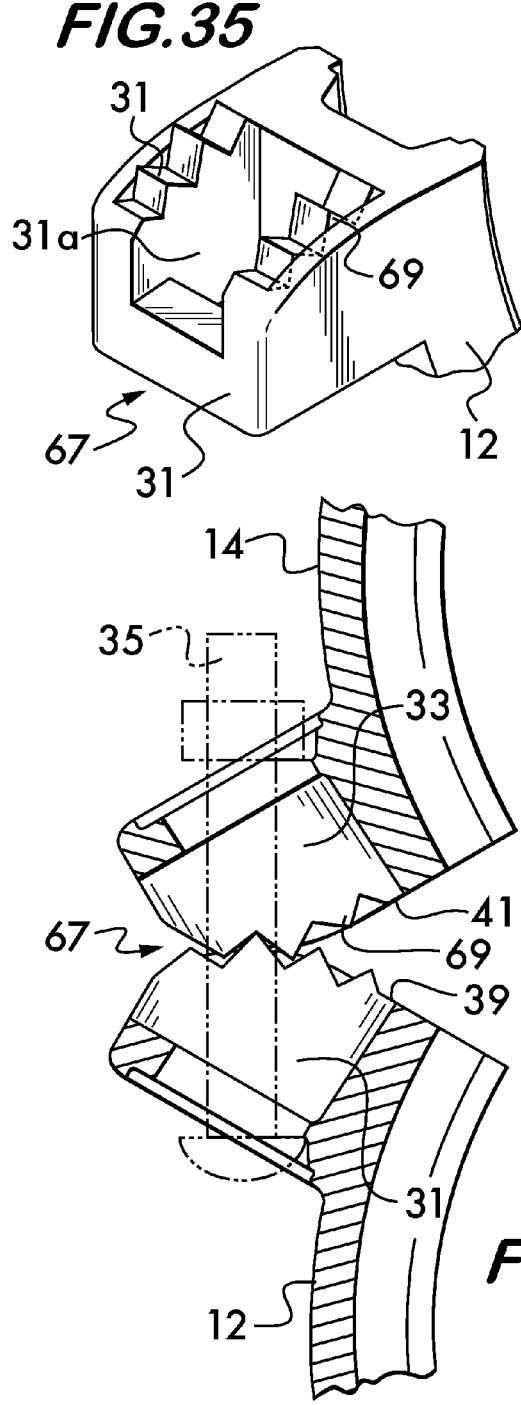
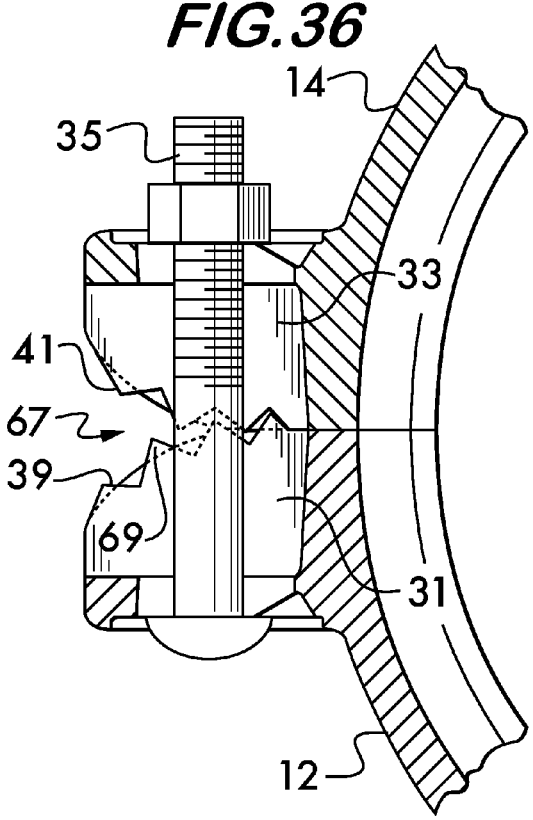

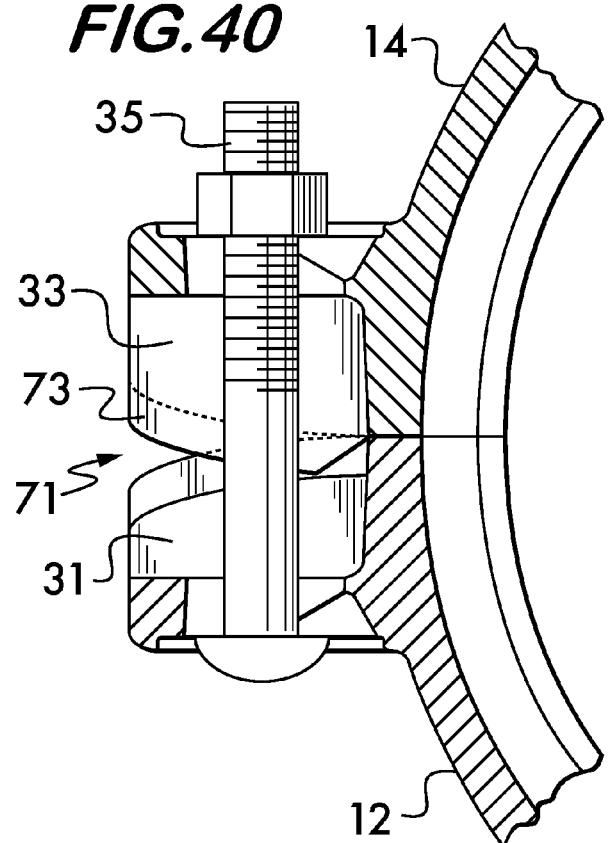
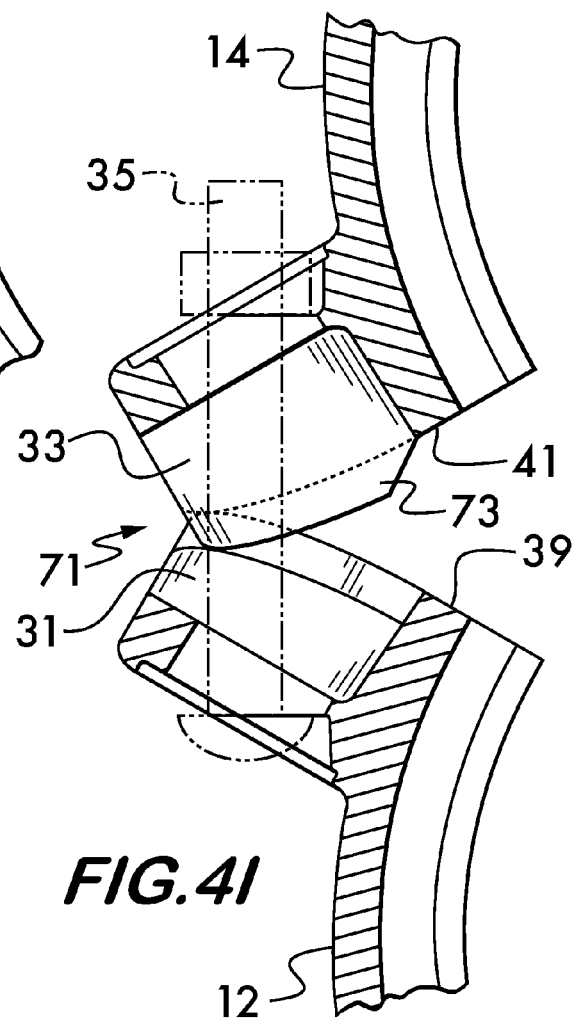

PIVOTING PIPE COUPLING HAVING A MOVABLE GRIPPING BODY

CROSS REFERENCE TO RELATED APPLICATION

This application is based upon and claims priority to U.S. Provisional Application No. 61/471,713, filed Apr. 5, 2011 and which is hereby incorporated by reference herein in its entirety.

FIELD OF THE INVENTION

This invention relates to couplings for joining pipe elements in end-to-end relationship.

BACKGROUND

Mechanical couplings for joining pipe elements end-to-end find widespread use throughout a broad spectrum of industries such as the chemical industry, the petroleum industry and mining, as well as in municipal water service and fire suppression systems for buildings and other structures.

An example of a prior art coupling currently in use is provided in U.S. Pat. No. 7,086,131, which discloses a coupling having a pair of coupling segments joined end-to-end by fasteners received in lugs at each end of the segments. A sealing member is positioned between the segments. The coupling is pre-assembled at the factory. The segments are designed and sized to receive pipe elements in the field which are inserted directly between the coupling segments in the pre-assembled state, without the need to disassemble and reassemble the coupling. After insertion of the pipe elements, the fasteners are tightened to effect a fluid-tight, mechanically restrained joint between the pipe elements.

While it is advantageous to pre-assemble such couplings because it saves time and thereby cost during construction, power tools are often used to tighten the fasteners for convenience, as they are faster and less fatiguing. Power tools are of limited value, however, where no source of electrical power or compressed air is available, even those tools which are battery operated. Furthermore, power tools which cause electrical sparking may not be used in environments, such as mines, where explosive conditions may exist. It would be advantageous to provide a pipe coupling which can be pre-assembled (and thereby secure the cost advantages and convenience of such couplings) while being easily manually tightened by workmen installing the couplings. It is further advantageous to decrease the stiffness of the joint formed by the coupling for certain applications. This can be accomplished by employing couplings according to the invention.

SUMMARY

The invention concerns pipe couplings for securing end portions of a pair of pipe elements together end-to-end. In one example embodiment, the coupling comprises a pair of segments connected end-to-end surrounding a central space for receiving the pipe elements. Each the segment has a pair of arcuate surfaces positioned in spaced relation. The arcuate surfaces face the central space and are engageable with the pipe elements. A pivot attachment is positioned at one end of the segments. The pivot attachment pivotally connects the segments to one another. Connection members are positioned on each of the segments at an end opposite to the pivot attachment. The connection members are adjustably tightenable for drawing the segments toward one another. At least one reaction surface is positioned on each of the segments. The reaction surfaces face toward the central space. At least one gripping body is positioned between the segments. The gripping body has a pair of gripping surfaces positioned in spaced apart relation and facing the central space. A pair of contact surfaces are positioned on the gripping body. Each of the contact surfaces are in facing relation with one of the reaction surfaces. Adjustable tightening of the connection members pivots the segments about the pivot attachment thereby drawing the coupling segments together for engagement of the arcuate surfaces with the pipe elements. The contact surfaces interact with the reaction surfaces to move the gripping body toward the central space for engagement of the gripping surfaces with the pipe elements.

In one example embodiment, the at least one gripping body is positioned adjacent to the connection members. In another example embodiment, the at least one gripping body is positioned adjacent to the pivot attachment.

In a particular example embodiment, each of the connection members may comprise a projection extending outwardly from the end of the segment opposite to the pivot attachment. The projections are adapted to receive a fastener for adjustably connecting the segments to one another. The reaction surfaces may be positioned on each of the projections.

In some example embodiments, either or both the contact surfaces and/or the reaction surfaces may have a convex shape.

In a particular example embodiment, the pivot attachment comprises a hinge having at least one bearing positioned on each segment, the bearings being connected by an axle. In another example embodiment, the pivot attachment comprises a hinge having a pair of bearings positioned on one of the segments and a single bearing positioned on another of the segments. The pair of bearings is connected to the single bearing by an axle. In another example embodiment the pivot attachment comprises a tang projecting from one of the segments and a stirrup extending from the other of the segments. The tang interfits within the stirrup, the tang and stirrup being pivotable relatively to one another. In another example embodiment the pivot attachment comprises a first projection extending from one of the segments. A first slot is positioned in the first projection. a first curved surface is positioned on the first projection. A second projection extends from another of the segments. A second slot is positioned in the second projection. A second curved surface is positioned on the second projection. The second curved surface interfaces with the first curved surface. A fastener extends through the first and second slots between the first and second projections. At least one rib may be positioned on the first curved surface. The at least one rib may be oriented substantially parallel to the first slot. At least one recess may be positioned within the second curved surface. The at least one recess may be oriented substantially parallel to the first slot. The at least one rib is received within the at least one recess.

In another example embodiment the pivot attachment may comprise a first projection extending from one of the segments. A first slot is positioned in the first projection. At least one first tooth is positioned on the first projection. A second projection extends from another of the segments. A second slot is positioned in the second projection. At least one second tooth is positioned on the second projection. The second tooth interfaces with the first tooth. A fastener extends through the first and second slots between the first and second projections. The coupling may further comprise a plurality of the first and second teeth. The first and second teeth may comprise intermeshing gear teeth, or the first and second teeth comprise intermeshing splines, for example.

In another example embodiment the pivot attachment comprises a first projection extending from one of the segments. A first slot is positioned in the first projection. A second projection extends from another of the segments. A tongue is positioned on the second projection and interfaces within the first slot on said first projection. A fastener extends between the first and second projections, and through the first slot and the tongue.

In some example embodiments a sealing member is captured between the segments and positioned between the arcuate surfaces. The sealing member has inwardly facing sealing surfaces engagable with the pipe elements for forming a fluid-tight joint between the pipe elements. The sealing member may have an outer surface with a diameter sized so as to support the segments and the gripping body in spaced relation away from the central space sufficient to permit insertion of the pipe elements into the central space. To facilitate insertion of the pipe elements, the coupling may further comprise at least one notch positioned in at least one of the arcuate surfaces. The notch maybe positioned adjacent to the pivot attachment.

The invention also encompasses a method of joining pipe elements in end to end relation using a coupling having opposed coupling segments and a movable gripping body positioned therebetween. In one example embodiment, the method comprises:

inserting the pipe elements into the coupling;

drawing the coupling segments into engagement with the pipe elements by pivoting the coupling segments about a pivot axis; and moving the gripping body into engagement with the pipe elements.

The method may further comprise supporting the segments and the gripping body on an outer surface of a seal. The segments and the gripping body are supported in spaced relation sufficient to permit insertion of the pipe elements into the coupling. The method may further comprise deforming the segments so as to conform them to the pipe elements.

BRIEF DESCRIPTION OF THE DRAWINGS

FIG. 5 is an isometric view of an alternate embodiment of the coupling shown in FIG. 1;

FIG. 6 is an isometric view of an alternate embodiment of the coupling shown in FIG. 1;

FIG. 7 is an exploded isometric view of another example embodiment of a coupling according to the invention;

FIGS. 8 and 9 are cross sectional views of the coupling shown in FIG. 7;

FIGS. 8a and 8b are cross sectional views of another example embodiment of the coupling shown in FIG. 7;

FIG. 10 is an isometric view of the coupling shown in FIG. 7;

FIG. 11 is an isometric exploded view of another example coupling embodiment according to the invention;

FIGS. 12 and 13 are cross sectional views of the coupling shown in FIG. 11;

FIG. 12A is a cross sectional view taken at line 12A-12A in FIG. 12;

FIG. 13A is a cross sectional view taken at line 13A-13A in FIG. 13;

FIG. 14 is an isometric view of the coupling shown in FIG. 11;

FIG. 15 is an isometric exploded view of another example coupling embodiment according to the invention;

FIGS. 16 and 17 are cross sectional views of the coupling shown in FIG. 15;

FIG. 20 is an isometric view of an example pivot attachment useable with a coupling according to the invention;

FIGS. 21 and 22 are cross sectional views taken at line 21-21 of FIG. 20;

FIG. 23 is an isometric view of an example pivot attachment useable with a coupling according to the invention;

FIG. 24 is a cross sectional view of an example coupling having the pivot attachment shown in FIG. 23;

FIG. 25 is a cross sectional view of the pivot attachment depicted in FIG. 23 on an enlarged scale;

FIG. 26 is an isometric view of an example pivot attachment useable with a coupling according to the invention;

FIG. 27 is a cross sectional view of an example coupling having the pivot attachment shown in FIG. 26;

FIG. 28 is a cross sectional view of the pivot attachment depicted in FIG. 26 on an enlarged scale;

FIG. 29 is an isometric view of an example embodiment of a pivot attachment used with couplings according to the invention;

FIGS. 30 and 31 are side views showing the pivot attachment depicted in FIG. 24 in closed and open configurations respectively;

FIG. 32 is an isometric view of an example embodiment of a pivot attachment used with couplings according to the invention;

FIGS. 33 and 34 are side views showing the pivot attachment depicted in FIG. 32 in closed and open configurations respectively;

FIG. 35 is an isometric view of an example embodiment of a pivot attachment used with couplings according to the invention;

FIGS. 36 and 37 are side views showing the pivot attachment depicted in FIG. 35 in closed and open configurations respectively;

FIGS. 40 and 41 are side views showing the pivot attachment depicted in FIGS. 38 and 39 in closed and open configurations respectively.

DETAILED DESCRIPTION

Figure 1:
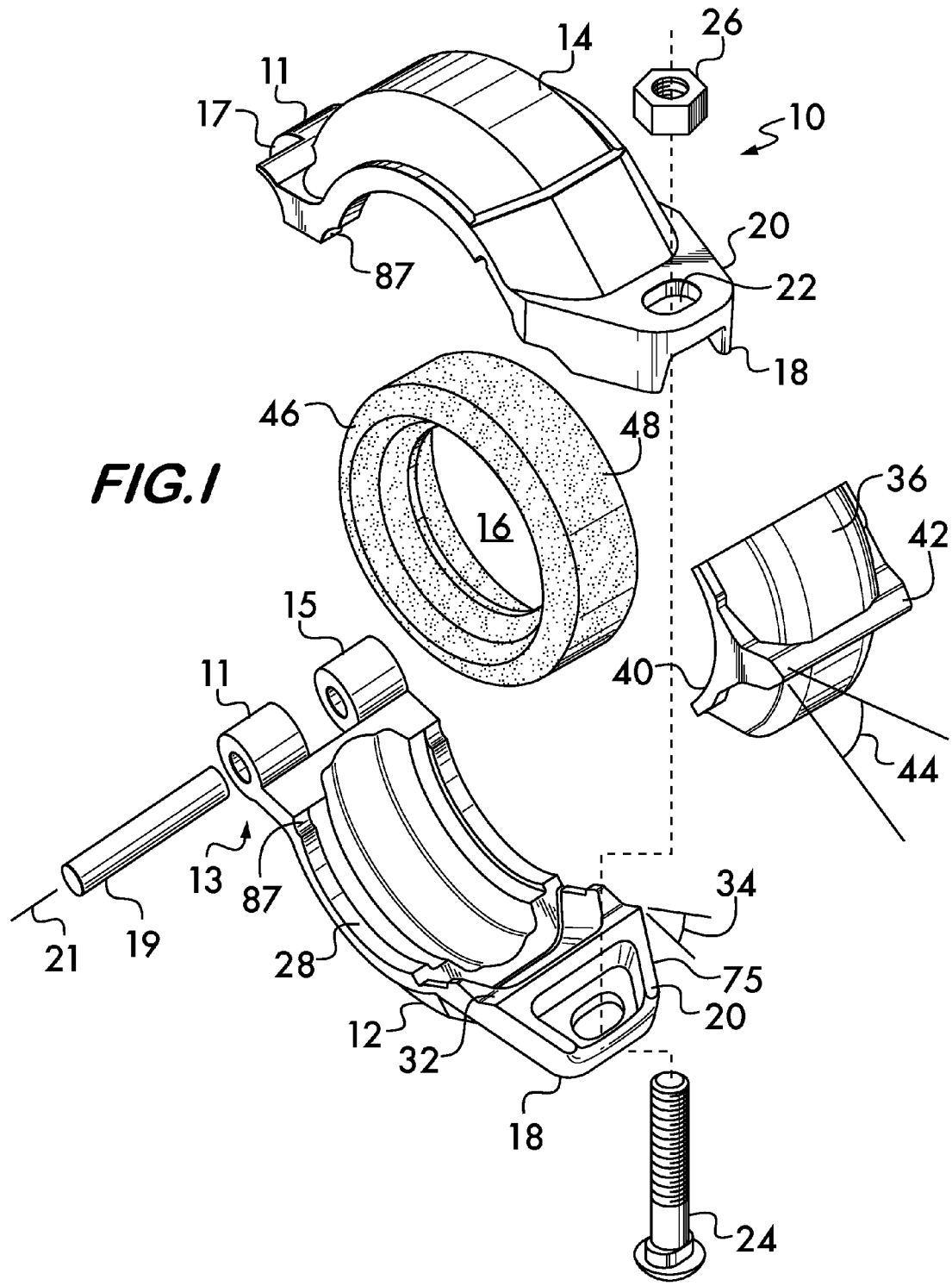
FIG. 1 is an exploded isometric view of an example embodiment of a coupling according to the invention.

FIG. 1 shows an exploded isometric view of a coupling embodiment 10 according to the invention. Coupling 10 comprises a plurality of segments 12 and 14. Segments 12 and 14 are connectable end-to-end to surround a central space 16. Connection of the segments at one end 11 is effected by means of a pivot attachment 13. In this example embodiment, pivot attachment 13 is a mortise hinge comprising a pair of bearings 15 mounted on segment 12 in side by side spaced apart relation, and a single bearing 17 mounted on segment 14. Bearing 17 is sized to interfit between the bearing pair 15, and all three bearings receive an axle 19 which defines an axis 21 about which the segments 12 and 14 pivot on pivot attachment 13. Other pivot attachment embodiments are also feasible.

As shown, for example, in FIGS. 20, 21 and 22, the pivot attachment 23 comprises a tang 25 mounted on segment 14. The tang projects radially outwardly from the segment and interfits within a stirrup 27 which is mounted on and projects from the segment 12. The tang and stirrup bear against one another when the segment ends opposite to them are forced toward each other as shown in FIGS. 20 and 21, thereby providing a secure joint between segments 12 and 14. However, because the tang and stirrup are not fixedly attached to one another, they, and the segments 12 and 14, are free to pivot away from one another, thereby acting as a hinge as shown in FIG. 22.

FIG. 23 shows an example pivot attachment embodiment 29 wherein the pivot attachment components comprise projections 31 and 33, each projection being mounted respectively on segments 12 and 14. The projections are pivotally connected to each other by a fastener 35 which is oriented transversely to the axis 37 about which the segments pivot. In this example, the fastener comprises a nut and bolt, but it could also be a double headed pin. Use of a nut and bolt fastener 35 allows for additional adjustment of the connection between the segments 12 and 14 once the joint is formed. FIG. 23 shows a slot 31a in projection 31 and a slot 33a similarly formed in projection 33. Fastener 35 is received in slots 31a and 33a within the projections 31 and 33 respectively. As shown in a comparison of FIGS. 24 and 25, the projections 31 and 33 have interfacing curved surfaces 39 and 41 which allow the projections, and the segments attached thereto, to pivot about axis 37 between an open configuration (FIG. 25) and a closed configuration (FIG. 24). Note that, unlike a conventional hinge, axis 37 is not fixed relative to the segments, but moves laterally as the segments pivot. To facilitate the pivoting motion, each segment 12 and 14 has a recess 43 which receives the ends 45 of fastener 35 in bearing and acts as a stop to limit the relative pivoting motion between the segments as illustrated in FIG. 25.

Another pivot attachment embodiment 47 is shown in FIGS. 26, 27 and 28, wherein projections 49 and 51 on segments 12 and 14 have angularly oriented interfacing surfaces 53 and 55. These surfaces permit relative pivoting motion of the segments about the axis 37 as shown by a comparison of the FIGS. 27 and 28, which illustrate motion of the segments between an open configuration (FIG. 28) and a closed configuration (FIG. 27). Note that, unlike a conventional hinge, axis 37 is not fixed relative to the segments, but moves laterally as the segments pivot. FIG. 26 shows a slot 49a in projection 49. A slot 51a is similarly formed in projection 51. Fastener 35, received within slots 49a and 51a defined by the projections 49 and 51. Fastener 35 again holds the segments together but permits the pivoting motion.

It may be desirable to incorporate features into the interfacing surfaces of the projection pairs 31 and 33 which prevent relative motions between the segments which are other than pivoting motion about an axis. FIG. 29 shows an example pivot attachment embodiment 57 wherein the interfacing curved surfaces 39 and 41 (not shown) have a projecting rib 59 positioned on one side of the projection 31, and a recess 61 on the other side of the projection. When in use, as shown in FIGS. 30 and 31, the segments 12 and 14 are aligned such that the projecting rib 59 on one segment interfits within the recess 61 on the other segment, and vice-versa. Interaction between the ribs and the recesses prevents relative axial motion of the segments at the pivot attachment, thereby maintaining their mutual alignment.

In another example pivot attachment 63, shown in FIGS. 32, 33 and 34, the interfacing curved surfaces 39 and 41 of the projections 31 and 33 have at least one, but preferably a plurality of teeth 65 which mesh with one another during pivoting motion of the segments to prevent lateral motion of the segments relatively to one another. In this example the teeth 65 are gear teeth. FIG. 33 depicts the segments 12 and 14 in a closed configuration; FIG. 34 depicts the segments in an open configuration.

In yet another pivot attachment embodiment 67, shown in FIGS. 35, 36 and 37, splines 69 comprise the tooth or teeth which are associated with the interfacing surfaces 39 and 41 of the projections 31 and 33. The splines 69 intermesh similarly to gear teeth to prevent lateral motion between the coupling segments. FIG. 36 depicts the segments 12 and 14 in a closed configuration; FIG. 37 depicts the segments in an open configuration.

As shown in FIGS. 38-41, another pivot attachment embodiment 71 has a tongue 73 mounted on the projection 33 on one segment (14). Tongue 73 is received within the slot 31a of the projection 31 on the other segment (12) to prevent relative axial motion between the segments. The tongue 73 engages the slot 31a to prevent lateral motion between the coupling segments. Note that the tongue 73 may be split to accommodate the fastener 35. FIG. 40 depicts the segments 12 and 14 in a closed configuration; FIG. 41 depicts the segments in an open configuration.

The various pivot attachment embodiments shown in FIGS. 17-33 are disclosed in detail in U.S. Pat. No. 4,702,499 to de Raymond et al., which is hereby incorporated by reference herein in its entirety. It is noted that the pivot attachment joining the segments may have a center of motion about which the segments rotate which is fixed relatively to the coupling. For example, traditional hinges, such as the mortise hinge shown in FIG. 1, have a fixed center of motion, indicated by axis 21. However, the invention also encompasses pivot attachments for which the instantaneous center of motion is not fixed, but moves as the segments pivot relatively to one another. Such pivot attachments are shown in FIGS. 23-25 herein, which show the movement of the instantaneous center of motion by the shifting of axis 37.

With reference again to FIG. 1, connection of the segments 12 and 14 at end 75 opposite to the pivot attachment 13 is effected by a connection member 18. In this embodiment, the connection member comprises projections 20 which extend outwardly from the ends of the segments. Projections 20 have apertures 22 adapted to receive a fastener, such as bolt 24 which cooperates with nut 26. The fastener is adjustably tightenable and cooperates with the projections 20 for drawing the segments 12 and 14 toward the central space 16 upon tightening.

Each segment has a pair of arcuate surfaces 28. Surfaces 28 are positioned in spaced relation to one another and face the central space 16. The arcuate surfaces engage and retain pipe elements 30 (see FIG. 4) when the fastener connecting projections 20 is tightened to draw the segments toward each other. The arcuate surfaces may engage circumferential grooves in the pipe elements, plain ended pipe elements, flared end pipe elements or pipe ends having a shoulder or a shoulder and bead. The arcuate surfaces 28 may have notches 87 positioned adjacent to the end 11 having the pivot attachment 13. Notches 87 provide radial clearance which allows pipe elements to be inserted between the segments 12 and 14 before the segments are drawn toward the central space 16 to effect the joint by engaging the pipe elements 30.

Each segment also has at least one, but preferably a plurality of, reaction surfaces 32. Reaction surfaces 32 may be positioned on the connection members 18. In the embodiment shown in FIG. 1, two reaction surfaces 32 are positioned on each projection 20. The reaction surfaces are angularly oriented with respect to the projections, and may have an orientation angle 34 from about 30° to about 60° and are inclined so as to face the central space 16. Orientation angles of about 45° are preferred as explained below.

Coupling 10 also comprises a gripping body 36 positioned between the segments 12 and 14 opposite to the pivot attachment 13. The gripping body has a pair of gripping surfaces 40 (only one being shown). Similar to the arcuate surfaces 28, the gripping surfaces are positioned in spaced apart relation and face the central space 16. The gripping body has a pair of contact surfaces 42 (only one being shown) positioned in facing relation with the reaction surfaces 32 on the projections 20 of the segments 12 and 14. The contact surfaces are also angularly oriented with respect to the projections, and may have an orientation angle 44 from about 30° to about 60°. Orientation angles of about 45° are preferred as explained below. Preferably, the orientation angles 34 and 44 are complementary to one another, meaning that they have approximately the same angular orientation.

Upon assembly of the coupling 10, a seal 46 is captured within the central space 16 by the segments 12 and 14 and the gripping body 36. Seal 46 ensures that the coupling 10 provides a fluid-tight joint between pipe ends. The seal 46 is sized so that, in an undeformed state, its outer circumference 48 supports the segments 12 and 14 and the gripping body 36 in spaced apart relation sufficient for pipe elements to be inserted into the central space 16 without disassembling the coupling.

Figure 2:
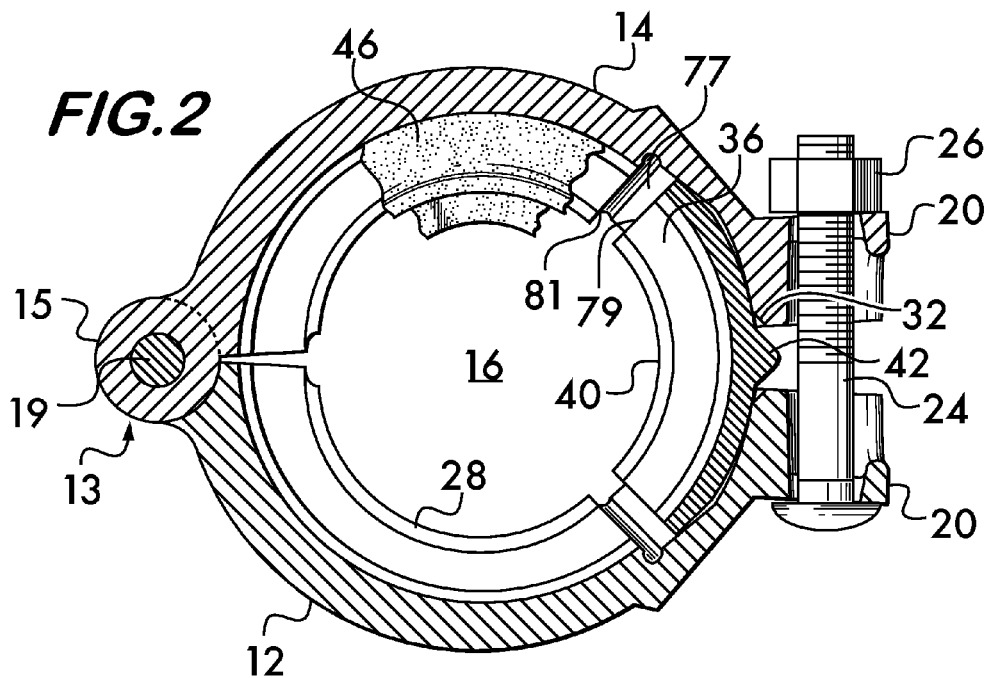
FIGS. 2 and 3 are cross-sectional views of the coupling shown in FIG. 1.
Figure 3:
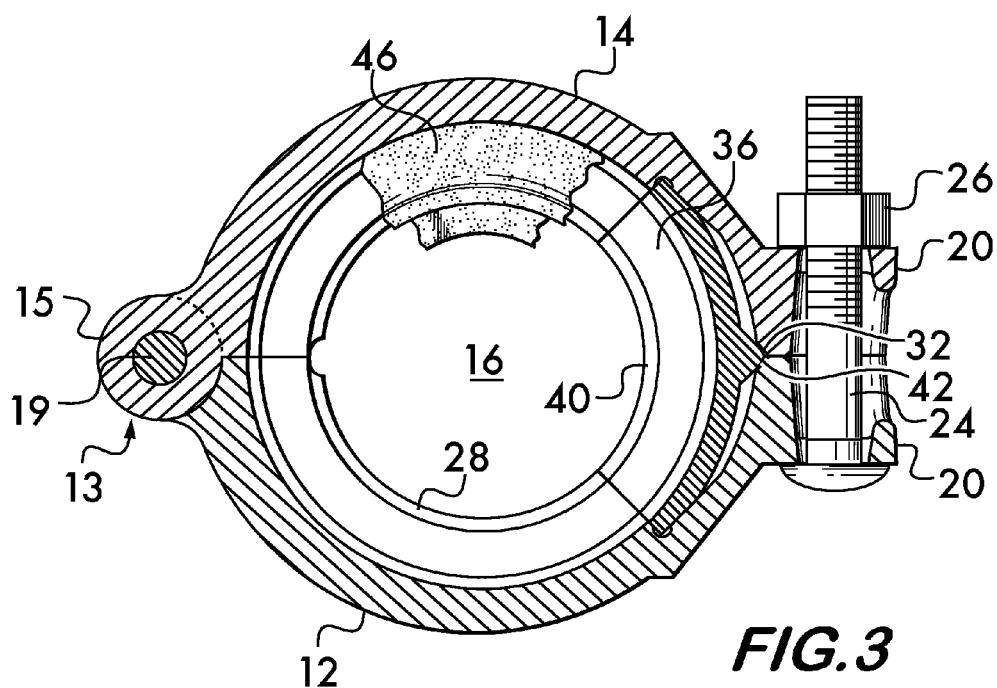
Figure 4:
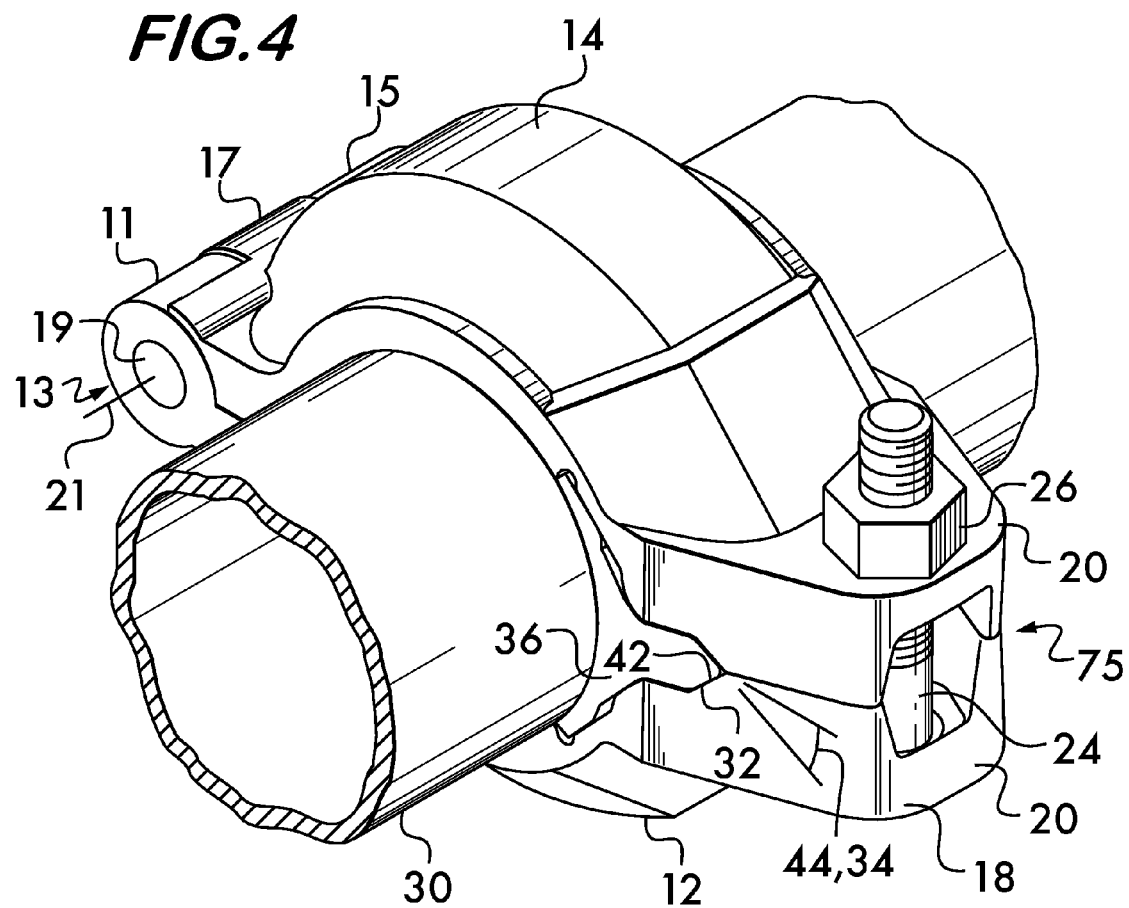
FIG. 4 is an isometric view of the coupling shown in FIG. 1.

Operation of the coupling is described with reference to FIGS. 2-4. FIG. 2 shows the coupling 10 as received from the factory in an open configuration in the pre-assembled state, ready for installation. In this configuration, the fastener 24 is not yet tightened, thereby allowing the segments 12 and 14 and the gripping body 36 to be positioned radially outwardly away from the central space 16 to allow pipe elements (not shown for clarity) to be inserted into the central space. As noted above, the seal 46 is sized to hold the segments and gripping body radially outwardly to facilitate pipe insertion. Upon insertion, the pipe elements engage the seal 46 which provides fluid tightness to the joint. Next, the bolt 24 and nut 26 are tightened, drawing the segments 12 and 14 toward one another and the central space 16 and into a closed configuration as shown in FIGS. 3 and 4. As the segments move, the arcuate surfaces 28 are brought into engagement with the outer surface of the pipe elements to retain them in the coupling. As shown by a comparison of FIGS. 3 and 4, motion of the segments 12 and 14 toward one another causes the gripping body 36 to move inwardly toward the central space 16, in a direction substantially perpendicular to the motion of the segments. This permits the gripping surfaces 40 on the gripping body 36 to also engage the outer surface of the pipe elements. Motion of the gripping bodies toward the central space 16 is effected by the interaction of the contact surfaces 42 on the gripping body with the reaction surfaces 32 on the projections 20. The angular orientation 44 and 34 (see FIG. 1) of the contact surfaces and the reaction surfaces respectively, allows the forces between the surfaces to be resolved into a component directed toward the central space. This force, applied at the contact surfaces, causes the motion of the gripping body toward the central space. As noted above, orientation angles of about 45° are preferred for both the reaction surfaces and the contact surfaces.

As shown in FIG. 2, there are multiple gaps 77 between the end faces 79 of the gripping body 36, and shoulders 81 on segments 12 and 14. The gaps 77 allow for the relative motion between the gripping body and the segments.

It is advantageous to position the reaction surfaces 32 on the projections 20 and have the contact surfaces 42 project substantially radially outwardly away from the central space 16 so that the interface between the contact surfaces and the reaction surfaces is near the fastener (bolt 24, nut 26) which joins the connection members 18 (in this example projections 20) to one another. Internal pressure within the coupling 10, acting on the seal 46, will force the segments 12 and 14 and the gripping body 36 away from the central space. Force applied to the gripping body within the coupling is transmitted to the segments at the interface between the contact surfaces 42 and the reaction surfaces 32. Due to their angular orientation, the contact surfaces 42 will tend to act like a wedge and force the projections 20 apart. By placing the interface close to the fastener joining the projections, the separation of the projections will be less than if the interface were farther from the fastener. The advantageous positioning of the contact surface-reaction surface interface minimizes the separation of the segments and allows the coupling to withstand higher pressures without leaking. Furthermore, by placing the reaction forces between the segments and the gripping bodies near the fasteners, the distortion of the segments by the gripping body is lessened and the coupling better maintains its round shape.

FIG. 5 illustrates another example embodiment 83 of a coupling according to the invention. In this embodiment, the contact surfaces 42 on the gripping body 36 have a convex shape. This permits them to engage the reaction surfaces 32 tangentially when the segments 12 and 14 are drawn toward one another, resulting in reaction forces which cause motion of the gripping body 36 toward the central space. The reaction surfaces 32 are angularly oriented. FIG. 6 shows another example coupling embodiment 85, wherein the reaction surfaces 32 have a convex shape and the contact surfaces 42 are angularly oriented. This again allows for tangential engagement between the reaction surfaces and the contact surfaces, resulting in reaction forces which cause motion of the gripping body 36 toward the central space as the segments 12 and 14 are drawn toward each other.

FIG. 7 shows an isometric exploded view of another example coupling embodiment 50 according to the invention. Coupling 50 has segments 12 and 14 joined together at one end by a pivot attachment 23, and by a threaded fastener 58 which cooperates with connection members 18 at the other end. Note that, as with the previously described coupling embodiments, any type of pivot attachment is feasible. Each segment has arcuate surfaces 28 for engaging pipe elements. Coupling 50 has a gripping body 36 positioned between the segments and opposite to the pivot attachment 23. The gripping body has four contact surfaces 52 positioned on opposite sides as well as two gripping surfaces 40 positioned in spaced relation and facing the central space 16. Again, in this example, the contact surfaces are angularly oriented with respect to the connection members 18 and interface with reaction surfaces 54 positioned on the connection members 18. Orientation angles 56 for the contact surfaces from about 30° to about 60° are advantageous for this coupling design. It is preferred that the orientation angle of the reaction surfaces 54 be approximately the same as that of the contact surfaces 52 as shown in FIG. 10.

As shown in FIGS. 8a and 8b, one or both of the contact surfaces 52 and the reaction surfaces 54 may have a convex shape. Such a shape is found advantageous when large compression forces are to be applied to the pipe elements by the gripping body 36 and the segments 12 and 14. The convex shape of either or both the contact surfaces 52 and the reaction surfaces 54 moves the reaction point between the surfaces away from the end of the surfaces and more toward the center of the gripping body 36.

Operation of coupling 50 is similar to that of coupling 10 described above. As shown in FIG. 8, before tightening of fastener 58, the segments 12 and 14 and the gripping body 36 are spaced outwardly away from the central space 16 so as to allow a pipe element to be inserted into the central space. Tightening of the fastener as shown in FIG. 9 draws the segments 12 and 14 toward one another and the central space, allowing the arcuate surfaces 28 to engage the pipe elements' outer surface. Interaction between the contact surfaces 52 on the gripping body 36 and the reaction surfaces 54 on the segments 12 and 14 forces the gripping body to move inwardly toward the central space as the fastener 58 is tightened. The inward motion of the gripping body allows its gripping surfaces 40 to engage the pipe elements 30 as shown in FIG. 10. Similar to the previously described coupling embodiments, a seal 46 is captured between the segments 12 and 14 and the gripping body 36. As shown in FIG. 8, the outer circumference 48 of seal 46, when undeformed, is sized to support the segments and gripping body in spaced relation away from the central space sufficient to permit insertion of the pipe elements 30 into the central space when the coupling 50 is in an open configuration as shown in FIG. 8. When the coupling is in a closed configuration, as shown in FIG. 9, the seal 46 is compressed against the pipe elements by the segments and the gripping body and ensures a fluid tight joint.

FIG. 11 shows an exploded view of another coupling embodiment 60 according to the invention. Coupling 60 comprises coupling segments 12 and 14. The segments are arranged in facing relation and are joined at one end by a pivot attachment 23 and at the opposite end by connection members 18. In this embodiment, as with those previously described, the connection members comprise outwardly extending projections 20 which receive a fastener 58 that is adjustably tightenable. Tightening of the fastener draws the coupling segments 12 and 14 toward one another and the central space 16.

Each segment has inwardly facing arcuate surfaces 28 positioned in spaced relation to one another. The arcuate surfaces occupy positions between the ends of each segment. Reaction surfaces 32 are positioned in spaced relation at the end of each coupling segment 12 and 14 opposite to the pivot attachment 23. The reaction surfaces 32 are positioned between the projections 20 and the arcuate surfaces 28 and face inwardly toward the central space 16. The arcuate surfaces 32 extend in a tangential direction around the segments. The reaction surfaces may be angularly oriented as described below.

A gripping body 36 is positioned between the segments 12 and 14 adjacent to the connection members 18. The gripping body has inwardly facing gripping surfaces 40 arranged in spaced relation. Preferably, the gripping surfaces 40 align with respective arcuate surfaces 28 when the coupling is assembled as best shown in FIG. 14. With reference again to FIG. 11, the gripping body has contact surfaces 42 in spaced relation. Contact surfaces 42 face outwardly away from the central space 16 and engage respective reaction surfaces 32 on the segments 12 and 14. The contact surfaces on the gripping body cooperate with the reaction surfaces on the segments such that, when the segments are drawn toward one another, for example, by the tightening of fastener 58, the gripping body is urged radially inwardly as explained further below.

A seal 46 is positioned between the coupling segments 12 and 14 and the gripping body 36. Both the segments and gripping body have respective channels 62 and 64 (see FIG. 12). Channel 62 is positioned between the arcuate surfaces 28 and channel 64 is positioned between the gripping surfaces 40. The channels 62 and 64 receive the seal 46. The inner circumference 66 of the seal 46 has inwardly facing sealing surfaces 68 and 70 which engage pipe elements joined by the coupling to form a fluid-tight seal. The seal 46 is sized so that, in an undeformed state, its outer circumference 72 supports the segments 12 and 14 and the gripping body 36 in spaced apart relation sufficient for pipe elements to be inserted into the central space 16 when the coupling is in an open configuration as shown in FIG. 12. Preferably, the seal is a ring formed of an elastic, resilient material such as EPDM elastomer which deforms when the coupling segments are drawn toward one another by adjustably tightening the connection members 18.

FIG. 12 shows the pipe coupling 60 in its pre-assembled state, in an open configuration, ready for use. To effect a fluid-tight joint connecting pipe elements in end-to-end relation, pipe elements 30 are inserted into the sealing member 46, so that the segments straddle facing end portions of the pipe elements as shown in FIG. 12A. The pipe elements are inserted to an extent such that grooves 74 in the outer surfaces of the pipe elements align with the arcuate surfaces 28 of the segments and the gripping surfaces 40 of the gripping body 36. Insertion of the pipe elements to the proper depth may be facilitated by a pipe stop 76 positioned on the sealing member between the sealing surfaces 68 and 70. The pipe stop projects inwardly to engage the ends of the pipe elements and limit the insertion depth as desired.

FIGS. 12 and 13 show cross-sectional views of the coupling 60 with pipe element 30 inserted. Attention is drawn to the reaction surfaces 32 on segments 12 and 14 engaging the contact surfaces 42 on gripping body 36. The reaction surfaces are angularly oriented so that when the fastener 58 is tightened, drawing the segments 12 and 14 toward one another and into a closed configuration as shown in FIG. 13, the gripping body 36 is moved radially inwardly so that the gripping surfaces 40 on the gripping body engage and grip the grooves 74 of the pipe elements 30 shown in FIG. 13A. The motion of the segments 12 and 14 toward one another also causes the arcuate surfaces 28 on each segment to engage and grip the grooves as well as illustrated in FIG. 14. The pipe elements are, thus, secured in end-to-end relation. The sealing member is deformed radially inwardly to force the sealing surfaces 68 and 70 into further engagement with the outer surfaces of the pipe elements. This configuration produces a relatively rigid joint. A more flexible joint can alternately be provided if the motion of the arcuate surfaces is limited so that they do not engage and clamp the floor of the groove. To this end, the travel of the gripping bodies is limited by the extent or length of the reaction surfaces and the contact surfaces. Limitation of motion of the arcuate surfaces on the segments toward the central space is preferably controlled by limiting the motion of the segments through contact of the connection members 18.

As shown in FIG. 14, reaction surfaces 32 on segments 12 and 14 and contact surface 42 on gripping body 36 have a common orientation angle 78 measured with respect to the connection members 18, specifically, the interface 80 between members 18. Orientation angles 78 from about 30° to about 60° are practical, with an orientation angle of about 45° being advantageous for this embodiment in certain applications.

FIG. 15 shows an exploded view of another coupling embodiment 60a according to the invention. Coupling 60a comprises coupling segments 12 and 14. The segments are arranged in facing relation and are joined at one end by a pivot attachment 23 and at the opposite end by connection members 18. In this embodiment, as with those previously described, the connection members comprise outwardly extending projections 20 which receive a fastener 58 that is adjustably tightenable. Tightening of the fastener draws the coupling segments 12 and 14 toward one another and the central space 16.

Each segment has inwardly facing arcuate surfaces 28 positioned in spaced relation to one another. The arcuate surfaces occupy positions between the ends of each segment. Reaction surfaces 32 are positioned in spaced relation at the end of each coupling segment 12 and 14 adjacent to the pivot attachment 23 (unlike embodiment 60, where the reaction surfaces are adjacent to the connection members 18). The reaction surfaces 32 face inwardly toward the central space 16 and extend in a tangential direction around the segments. The reaction surfaces are angularly oriented as described above for embodiment 60.

A gripping body 36 is positioned between the segments 12 and 14 adjacent to the pivot attachment 23 (unlike embodiment 60 wherein the gripping body is adjacent to the connection members 18). The gripping body has inwardly facing gripping surfaces 40 arranged in spaced relation. Preferably, the gripping surfaces 40 align with respective arcuate surfaces 28 when the coupling is assembled. The gripping body 36 has contact surfaces 42 in spaced relation. Contact surfaces 42 face outwardly away from the central space 16 and engage respective reaction surfaces 32 on the segments 12 and 14 as shown in FIGS. 16 and 17. The contact surfaces on the gripping body cooperate with the reaction surfaces on the segments such that, when the segments are drawn toward one another, for example, by the tightening of fastener 58, the gripping body is urged radially inwardly as explained further below.

A seal 46 is positioned between the coupling segments 12 and 14 and the gripping body 36. Both the segments and gripping body have respective channels 62 and 64 (see FIG. 15). Channel 62 is positioned between the arcuate surfaces 28 and channel 64 is positioned between the gripping surfaces 40. The channels 62 and 64 receive the seal 46. The inner circumference 66 of the seal 46 has inwardly facing sealing surfaces 68 and 70 which engage pipe elements joined by the coupling to form a fluid-tight seal. The seal 46 is sized so that, in an undeformed state, its outer circumference 72 supports the segments 12 and 14 and the gripping body 36 in spaced apart relation sufficient for pipe elements to be inserted into the central space 16 when the coupling is in an open configuration as shown in FIG. 16. Preferably, the seal is a ring formed of an elastic, resilient material such as EPDM elastomer which deforms when the coupling segments are drawn toward one another by adjustably tightening the connection members 18.

FIG. 16 shows the pipe coupling 60a in its pre-assembled state, in an open configuration, ready for use. To effect a fluid-tight joint connecting pipe elements in end-to-end relation, pipe elements 30 are inserted into the sealing member 46, so that the segments straddle facing end portions of the pipe elements. The pipe elements are inserted to an extent such that grooves (not shown) in the outer surfaces of the pipe elements align with the arcuate surfaces 28 of the segments and the gripping surfaces 40 of the gripping body 36 (see FIG. 15). Insertion of the pipe elements to the proper depth may be facilitated by a pipe stop 76 positioned on the sealing member between the sealing surfaces 68 and 70 as shown in FIGS. 15 and 16. The pipe stop projects inwardly to engage the ends of the pipe elements and limit the insertion depth as desired.

FIGS. 16 and 17 show cross-sectional views of the coupling 60a with pipe element 30 inserted. Attention is drawn to the reaction surfaces 32 on segments 12 and 14 engaging the contact surfaces 42 on gripping body 36. The reaction surfaces are angularly oriented so that when the fastener 58 is tightened, drawing the segments 12 and 14 toward one another and into a closed configuration as shown in FIG. 17, the gripping body 36 is moved radially inwardly so that the gripping surfaces 40 on the gripping body engage and grip the grooves of the pipe elements 30. The motion of the segments 12 and 14 toward one another also causes the arcuate surfaces 28 on each segment to engage and grip the grooves as well. The pipe elements are, thus, secured in end-to-end relation. The sealing member is deformed radially inwardly to force the sealing surfaces 68 and 70 (see FIG. 15) into further engagement with the outer surfaces of the pipe elements.

Figure 18:
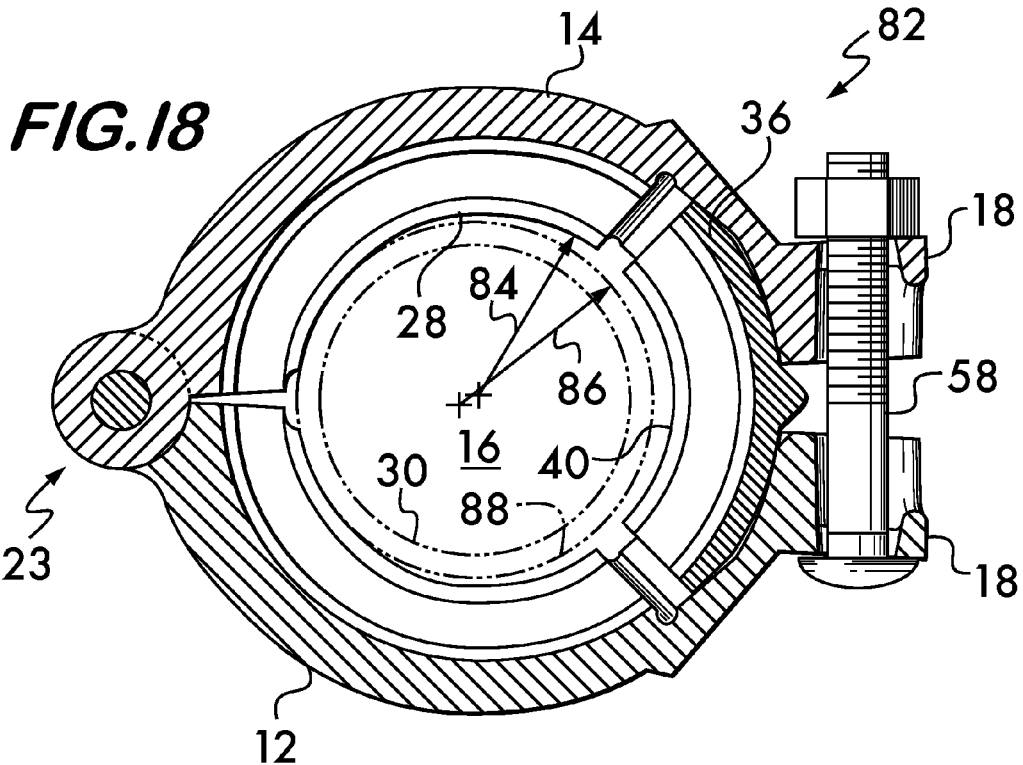
FIGS. 18 and 19 are cross sectional views of an alternate embodiment of an example coupling according to the invention.
Figure 19:
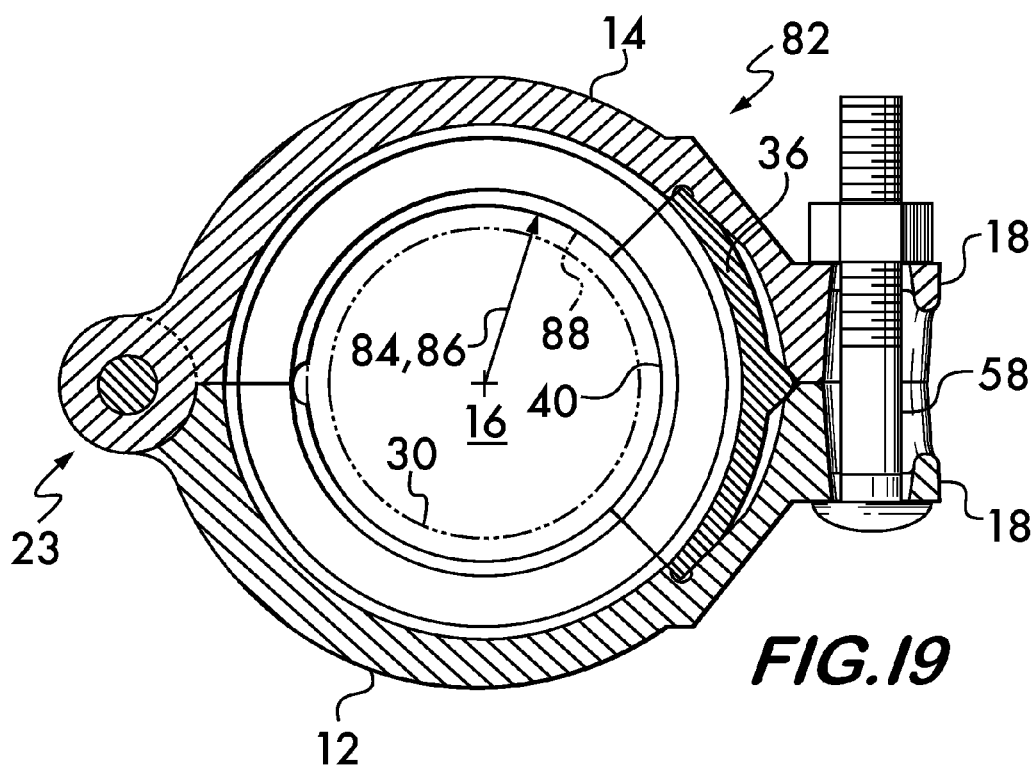
Figure 38:
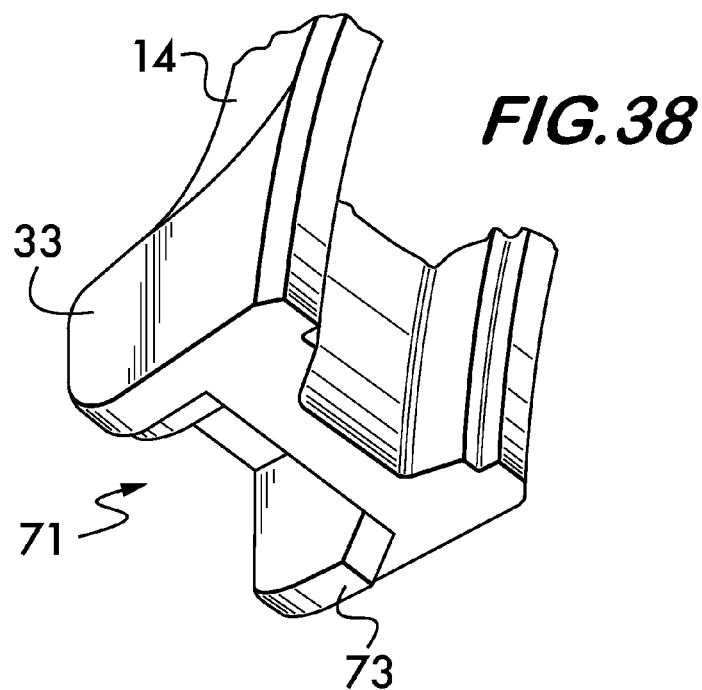
FIGS. 38 and 39 are is isometric views of an example embodiment of a pivot attachment used with couplings according to the invention.
Figure 39:
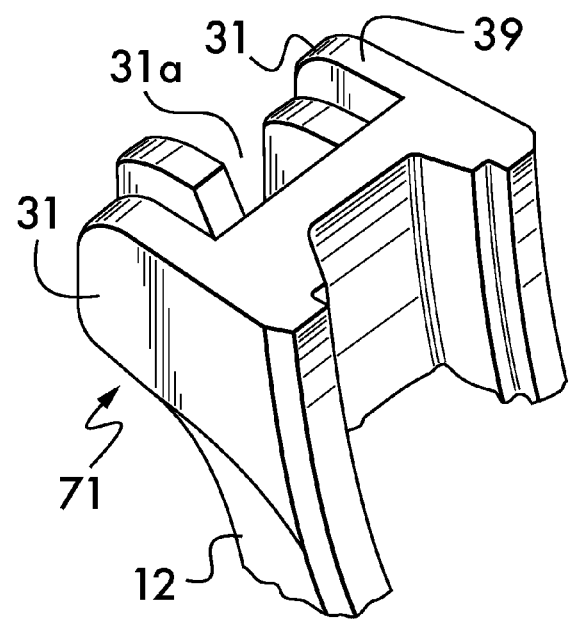

FIGS. 18 and 19 show another coupling embodiment 82, comprising segments 12 and 14 joined by a pivot attachment 23 at one end and having a gripping body 36 positioned between the segments opposite the pivot attachment. Coupling 82 is similar to the coupling embodiments previously described, but differs in that the arcuate surfaces 28 positioned on the segments 12 and 14 facing the central space 16 have radii of curvature 84 greater than the radius of curvature 86 of the outer surface 88 of the pipe elements 30 exclusive of the grooves, if any, in the outer surfaces of the pipe elements. The relation between the radii of curvature of the arcuate surfaces 28 and the pipe elements 30 is illustrated in FIG. 18, which depicts the coupling 82 in an open configuration, ready to receive pipe elements to form a joint. FIG. 19 shows the coupling 82 in a closed configuration, with pipe elements 30 inserted into the central space 16 and the fastener 58 tightened, cooperating with the connection members 18 on each segment to draw the segments toward one another, thereby engaging the arcuate surfaces with the pipe elements and forcing the gripping body 36 toward the central space by interaction of contact surfaces and reaction surfaces as described previously for other embodiments. Gripping surfaces 40 on the gripping body 36 move into engagement with the pipe elements, as shown by a comparison of FIGS. 18 and 19, and the segments 12 and 14 deform upon contact between their arcuate surfaces and the pipe elements such that the radius of curvature 84 of the arcuate surfaces 28 is reduced to conform approximately to the radius of curvature of the pipe elements along the line of contact 90 between them and the pipe elements, as shown in FIG. 19. The larger radius of curvature of the arcuate surfaces facilitates insertion of the pipe elements into the coupling by providing increased clearance when the coupling is in the open configuration as shown in FIG. 18. Deformable pipe couplings are described in U.S. Pat. No. 7,086,131 and 7,712,796, both of which are hereby incorporated by reference herein.

Couplings according to the invention realize an advantage through the use of the moving gripping bodies which allows them to be installed from the pre-assembled state using hand tools. The movable gripping bodies reduce the torque required to bring the segments together and grip the pipe elements to effect a fluid-tight joint. In addition, it is observed that having three components engage the pipe element, i.e., the gripping surfaces of the gripping body and the arcuate surfaces of the two segments provide for a more rigid coupling than when more components are present. This increase in rigidity is believed due to manufacturing tolerances of the pipe elements and the coupling, which render it difficult to ensure that more than three components will contact the pipe elements with the same degree of engagement.

What is claimed is:

1. A pipe coupling for securing end portions of a pair of pipe elements together end-to-end, said coupling comprising:
   a pair of segments connected end-to-end surrounding a central space for receiving said pipe elements, each said segment having a pair of arcuate surfaces positioned in spaced relation, said arcuate surfaces facing said central space and being engagable with said pipe elements;
   a pivot attachment positioned at one end of said segments, said pivot attachment pivotally connecting said segments to one another;
   connection members positioned on each of said segments at an end opposite to said pivot attachment, said connection members being adjustably tightenable for drawing said segments toward one another;
   at least one reaction surface positioned on each of said segments, said reaction surfaces facing toward said central space;
   at least one gripping body positioned between said segments, said gripping body having a pair of gripping surfaces positioned in spaced apart relation and facing said central space;
   a pair of contact surfaces positioned on said gripping body, each said contact surface being in facing relation with one of said reaction surfaces, at least one of said contact surfaces or at least one of said reaction surfaces having a convex shape; and wherein adjustable tightening of said connection members pivots said segments about said pivot attachment thereby drawing said coupling segments together for engagement of said arcuate surfaces with said pipe elements, said contact surfaces interacting with said reaction surfaces to move said at least one gripping body toward said central space for engagement of said gripping surfaces with said pipe elements.

2. The pipe coupling according to claim 1, wherein said at least one gripping body is positioned adjacent to said connection members.

3. The pipe coupling according to claim 2, wherein each of said connection members comprises a projection extending outwardly from said end of said segment opposite to said pivot attachment, said projections being adapted to receive a fastener for adjustably connecting said segments to one another, said reaction surfaces being positioned on each of said projections.

4. The pipe coupling according to claim 1, wherein said at least one contact surface has a convex shape.

5. The pipe coupling according to claim 1, wherein said at least one reaction surface has a convex shape.

6. The pipe coupling according to claim 1, wherein said pivot attachment comprises a hinge having at least one bearing positioned on each said segment, said bearings being connected by an axle.

7. The pipe coupling according to claim 1, further comprising a sealing member captured between said segments and positioned between said arcuate surfaces, said sealing member having inwardly facing sealing surfaces engagable with said pipe elements for forming a fluid-tight joint between said pipe elements.

8. The pipe coupling according to claim 7, wherein said sealing member has an outer surface sized so as to support said segments and said gripping body in spaced relation away from said central space sufficient to permit insertion of said pipe elements into said central space.

9. The pipe coupling according to claim 1, further comprising at least one notch positioned in at least one of said arcuate surfaces, said notch being positioned adjacent to said pivot attachment.

10. A pipe coupling for securing end portions of a pair of pipe elements together end-to-end, said coupling comprising:
    a pair of segments connected end-to-end surrounding a central space for receiving said pipe elements, each said segment having a pair of arcuate surfaces positioned in spaced relation, said arcuate surfaces facing said central space and being engagable with said pipe elements;
    a pivot attachment positioned at one end of said segments, said pivot attachment pivotally connecting said segments to one another;
    connection members positioned on each of said segments at an end opposite to said pivot attachment, said connection members being adjustably tightenable for drawing said segments toward one another;
    a pair of reaction surfaces positioned on each of said segments, said reaction surfaces facing toward said central space;
    at least one gripping body positioned between said segments, said gripping body having a pair of gripping surfaces positioned in spaced apart relation and facing said central space;
    first and second pairs of contact surfaces positioned on said gripping body, each said contact surface being in facing relation with one of said reaction surfaces on said segments, at least one of said pairs of contact surfaces or at least one of said pairs of reaction surfaces having a convex shape; and wherein adjustable tightening of said connection members pivots said segments about said pivot attachment thereby drawing said coupling segments together for engagement of said arcuate surfaces with said pipe elements, said contact surfaces interacting with said reaction surfaces to move said at least one gripping body toward said central space for engagement of said gripping surfaces with said pipe elements.

11. The pipe coupling according to claim 10, wherein said at least one gripping body is positioned adjacent to said connection members.

12. The pipe coupling according to claim 11, wherein each of said connection members comprises a projection extending outwardly from said end of said segment opposite to said pivot attachment, said projections being adapted to receive a fastener for adjustably connecting said segments to one another, said reaction surfaces being positioned on each of said projections.

13. The pipe coupling according to claim 10, wherein said at least one said pair of contact surfaces has a convex shape.

14. The pipe coupling according to claim 10, wherein said at least one said pair of reaction surfaces has a convex shape.

15. The pipe coupling according to claim 10, wherein said pivot attachment comprises a hinge having a pair of bearings positioned on one of said segments and a single bearing positioned on another of said segments, said pair of bearings being connected to said single bearing by an axle.

16. The pipe coupling according to claim 10, further comprising a sealing member captured between said segments and positioned between said arcuate surfaces, said sealing member having inwardly facing sealing surfaces engagable with said pipe elements for forming a fluid-tight joint between said pipe elements.

17. The pipe coupling according to claim 16, wherein said sealing member has an outer surface sized so as to support said segments and said gripping body in spaced relation away from said central space sufficient to permit insertion of said pipe elements into said central space.

18. The pipe coupling according to claim 10, further comprising a respective notch positioned in each of said arcuate surfaces, each of said notches being positioned adjacent to said pivot attachment.

* * * * *